US005746879A

United States Patent [19]

Huebner et al.

[11] Patent Number: 5,746,879

[45] Date of Patent: May 5, 1998

[54] APPARATUS FOR MAKING HONEYCOMB FROM SUBSTRATES AND NODE STRIPS

[75] Inventors: Fritz Huebner; Gerard J. Schoeb, both of Holland, Mich.

[73] Assignee: Plascore, Inc., Zeeland, Mich.

[21] Appl. No.: 534,112

[22] Filed: Sep. 26, 1995

Related U.S. Application Data

[62] Division of Ser. No. 226,939, Apr. 13, 1994, Pat. No. 5,670,001.

[51] Int. Cl.$^{6}$ .............................. B32B 31/18; B32B 31/20

[52] U.S. Cl. .......................... 156/516; 156/517; 156/543; 156/552; 156/582; 156/583.1

[58] Field of Search .................................... 156/543, 552, 156/197, 292, 290, 308.4, 309.6, 291, 516, 517, 582, 583.1; 428/116, 118, 188, 178, 179

[56] References Cited

U.S. PATENT DOCUMENTS

| | | | |
|---|---|---|---|
| 2,734,843 | 2/1956 | Steele | 156/197 |
| 3,053,310 | 9/1962 | Spooner | 156/543 |
| 3,134,705 | 5/1964 | Moeller | 156/197 |
| 3,366,525 | 1/1968 | Jackson | 156/197 |
| 3,379,594 | 4/1968 | Bruder | 156/292 |
| 3,519,510 | 7/1970 | Ardolino | 156/197 |
| 3,547,751 | 12/1970 | Morgan | 161/68 |
| 3,598,676 | 8/1971 | Noble | 156/205 |
| 3,600,249 | 8/1971 | Jackson | 156/197 |
| 3,673,058 | 6/1972 | Jackson | 161/68 |
| 3,678,558 | 7/1972 | Fredericks | 29/160 |
| 3,810,800 | 5/1974 | Doll | 156/78 |
| 3,813,273 | 5/1974 | Loustau | 156/469 |
| 4,410,575 | 10/1983 | Obayashi et al. | 156/308.4 |
| 4,450,027 | 5/1984 | Colson | 156/197 |
| 4,478,659 | 10/1984 | Hall | 156/73.1 |
| 4,500,583 | 2/1985 | Naul | 428/116 |
| 4,569,884 | 2/1986 | Weinand | 428/245 |
| 4,608,104 | 8/1986 | Holtrop et al. | 156/292 |
| 4,676,855 | 6/1987 | Anderson | 156/297 |
| 4,783,234 | 11/1988 | Simonton | 156/543 |
| 4,957,577 | 9/1990 | Huebner | 156/197 |
| 5,021,283 | 6/1991 | Takenaka | 428/116 |
| 5,043,038 | 8/1991 | Colson | 156/197 |
| 5,080,748 | 1/1992 | Bonomi | 156/552 |
| 5,139,596 | 8/1992 | Fell | 156/205 |
| 5,283,017 | 2/1994 | Rohleder et al. | 156/543 |

*Primary Examiner*—Richard Crispino

*Attorney, Agent, or Firm*—Price, Heneveld, Cooper, DeWitt & Litton

[57] ABSTRACT

Apparatus for forming honeycomb structure from a plurality of substrate layers. The layers are bonded together by spaced, parallel, solid node strips of thermoplastic material pressed and heated above the softening temperature to bond to the substrate surfaces and form a block. Several alternative apparatuses are disclosed.

13 Claims, 18 Drawing Sheets

APPARATUS FOR MAKING HONEYCOMB FROM SUBSTRATES AND NODE STRIPS

This is a divisional of application Ser. No. 08/226,939, filed Apr. 13, 1994, now U.S. Pat. No. 5,760,001, entitled HONEYCOMB FABRICATION.

BACKGROUND OF THE INVENTION

This invention relates to a method and apparatus for making honeycomb structure.

Honeycomb structure has been found useful for a wide variety of functions and purposes. As such, it is made from various materials including metal, e.g., aluminum, as well as paper, cloth and other materials. The primary techniques of forming honeycomb from layers, webs or sheets include expansion and corrugation. With the expansion technique, the sheets are adhered together at intervals and expanded. With the corrugation technique, layers or sheets are first formed into the corrugated configuration and then interconnected as by adhesive bonding, welding or otherwise.

In the known expansion process, the flat foil, fabric or film layers are typically joined together with thermosetting adhesive which is printed on the substrate sheet at discrete intervals to form bonding nodes. Adjacent sheets are printed at laterally offset intervals, see e.g. U.S. Pat. No. 4,957,577. The adhesive is suspended in a solvent typically amounting to around 80% of the composition. Multiple sheets and the applied thermosetting adhesive are cured under heat and pressure. If the substrate or layers are of a porous material, such as some fibrous materials, the liquid adhesive tends to penetrate completely through the layer so as to appear between the underlying and overlying layers, unless the sheets are specially pretreated. If this penetration happens, some or all of these layers may become bonded together in the heating and pressurizing stage into an unexpandable block. Consequently, preimpregnation pretreatment of the porous material sheets has normally been practiced as set forth, for example, in U.S. Pat. No. 3,519,510, to forestall penetration by the solvent adhesive clear through the layers. The solvent is evaporated from the adhesive and the layers and adhesive are carefully treated with heat an pressure applied to the plurality of sheets on which the adhesive has been printed. After cooling, the bonded structure is expanded, e.g., by connecting elements to the outer layers and pulling the structure into an expanded honeycomb.

The above-noted preimpregnation adds production steps and cost to the honeycomb forming process and product. Moreover, preimpregnation must be performed just right to prevent the product from becoming scrap. As an example, glass cloth is normally preimpregnated with a thermosetting resin and partially cured. This is done so that the cloth may be printed on later without the adhesive bleeding through the fabric. In this procedure the resin content and degree of curing are critical areas. If the resin content is too high, the core will be very difficult to expand. If the resin content is not high enough, there will be holes through which the later applied adhesive will bleed. This may result in a bond in the area that must remain unbonded for the honeycomb to be expanded, resulting in an unexpandable block. Cure of the resin is also critical. If the impregnating resin is not cured enough, it will soften and bond to the adjacent layer of material during the subsequent press cycle. This also results in an unexpandable block. If the resin is overcured, the material becomes very hard and rigid, so that during the expansion process the node adhesion is insufficiently strong and will break, resulting in a partial or total failure of the block. After the fabric has been preimpregnated, lines of adhesive are printed on the surface. The adhesive must be partially cured by passing through an oven. However, this also advances the cure of the preimpregnated resin. Therefore, getting the preimpregnated polymer cured to the degree needed is difficult.

Typically, after the block is expanded it is dipped in thermosetting resin and cured. Dipping may occur as many times as necessary to achieve the desired density and strength for the honeycomb.

In the corrugation process, foil or film is first passed through configurated rolls to form individual corrugated sheets. Fabrics are impregnated and/or coated somewhat first, and then corrugated. These sheets are cut to length. After corrugation, adhesive is applied to the protruding flat surface areas of the corrugated sheets, the sheets are stacked and pressed together to bring the formed flat areas together, and the thermosetting adhesive is cured, usually by heat, to form the final honeycomb core. Alternatively, the corrugated sheet flat areas can be fused together by welding. Thus, a series of foils, films or fabric layers become bonded together at the contacting surfaces to form the honeycomb core. In the welding process described in prior patents such as U.S. Pat. Nos. 4,957,577, 5,139,596 and 5,039,567, unreinforced substrates are welded together by using "anvils" which can tend to cut rather than weld the substrate, when physical alignment is off and/or temperatures are too high. The node areas need to be compressed a great deal to achieve flow of the resin to cause welding, and sometimes cause cutting when the correct parameters do not exist.

SUMMARY OF THE INVENTION

The present development enables formation of honeycomb, even utilizing fibrous porous sheets or layers, yet without requiring preimpregnation of the layers and without the previous difficulty of the bonding material penetrating through the porous fibrous layers to undesirably bond to underlying and/or overlying layers and cause an unexpandable block. The curing problems of the prior preimpregnated resin are not involved. Also, the solvent evaporation problem of the prior technology is not present. The bonding material does not require a solvent. Also, cutting of substrates by anvils is avoided. Rather, the development involves laying down of sheets or webs of substrate material, preferably a fibrous base material, with intermediate, evenly spaced strips of solid, reinforced or unreinforced thermoplastic, node strips having a desired softening temperature distinctly different from and less than its melting temperature. The structure is bonded together by applying pressure and sufficient heat to elevate the temperature of the strips to a temperature above the softening temperature of the thermoplastic material, but preferably below the melting temperature thereof, for a sufficient time to cause some of the softened, pressed, node bonding material to penetrate around the surface fibers of the adjacent fibrous layers, or by fusion to the adjacent layer, and thereby bond to the layers. Subsequently, the pressure is removed and the structure cooled. When the expansion process is employed, the bonded layers are expanded into a honeycomb structure.

In creating the layered assembly, various novel forms of apparatus can be employed to apply and fuse the thermoplastic node strips to the substrate material. The resulting material can be coiled for further processing at a later date, and/or may be cut to length and stacked, immediately or later, for honeycomb formation. Alternatively, the solid thermoplastic node strips may be applied at the time of sheeting. That is, the fiber based substrate may be cut to length and laid down with alternating layers of node material. Each layer may be pressed and heat fused individually to the underlying layer, or a plurality of sheets may be stacked into multiple layers and all pressed and heated at the same time. As noted, the solid node material is pressed and heated sufficiently to cause the thermoplastic strips to soften, but not so much as to cause the strips to melt and flow in an uncontrolled fashion under pressure. This feature of the solid thermoplastic strips, the ability to soften without melting, because of a distinct difference between the softening and the melting temperatures, is highly preferred because it allows the node material to bond the layers of the substrate together without bleeding through layers and fibrous substrates and creating an unexpandable block. The pressed block of honeycomb is subsequently expandable by a conventional expansion technique. The expanded honeycomb may be subsequently heat set or dipped in resin, typically a thermosetting resin, and cured to retain its final shape. It may also be dipped in resin repeatedly in order to increase its density and strength to the point desired.

Various substrate materials can be employed, including woven or nonwoven, natural or man made materials. These include, but are not limited to, glass cloth, glass mat, aramid paper, wood pulp paper, cotton cloth, polyester cloth, and/or polyester, polypropylene or polyethylene spun bonded papers. These materials may be preimpregnated, if desired, but this is not necessary for this process. Each individual layer can also be a laminate of thermoplastic film between or on both sides of sheets of the above noted porous materials. It is advantageous and preferable that the surfaces of the materials for these layers be fibrous in nature, and necessary that the layer materials be strong enough to withstand the forces imposed during the subsequent expansion process, and that the material surfaces have the capacity of not being softened, degraded or deteriorated at the softening temperature of the node bonding material.

The node bonding material is typically a solid thermoplastic substance, capable of being softened without melting, i.e., have a distinctly different softening temperature and melting temperature, and can be of a thermoplastic material including but not limited to one or more of polypropylene, polyethylene, polycarbonate, polyetherimide, polyethersulfone, polyetheretherketone and polyurethane polymers. High temperature thermoplastic can be used in applications where higher service temperatures are involved. The term thermoplastic used herein can, in its broadest sense, include materials that are otherwise considered thermosetting, but are not yet fully cured.

The node strips can be unreinforced or reinforced. The solid node strips can be reinforced with fiberglass or other engineered materials, resulting in increased strength of the honeycomb core. Reinforcing the thermoplastic node strips helps to prevent tearing and also helps to control the flow of the thermoplastic resin. The orientation of the reinforcing fibers can be varied in arrangement to obtain a variety of structural properties. Reinforcing materials may be fiberglass, Kevlar®, carbon fiber, quartz fiber, polyester fiber, or any other material that may be laminated, commingled, coated or impregnated with thermoplastic or partially cured thermosetting resin. The form of the solid node polymer strips can vary, including but not limited to nonperforated, perforated, expanded webbing, nonexpanded webbing, unidirectional, woven or random filaments or fibers, and polymer coated glass filaments or fibers.

This development substantially simplifies the creation of honeycomb structures, eliminates costly production steps, can be practiced on a variety of substrate materials, enables a variety of post-expansion steps to be practiced to produce a final product of desired characteristics, and is adaptable to high speed production techniques. Flow of the softened thermoplastic adhesive can be controlled by selection of rheometric properties, eliminating the need to preimpregnate the substrate and yet preventing bleed-through. Solvents, which bleed-through and present environmental problems, are not required.

A variation of the corrugation process can also be employed. Specifically, the individual substrate layers are corrugated to form layers or sheets with parallel, spaced, elevated surfaces or crests for bonding with like parallel, spaced, depressed surfaces of the adjacent layer. Strips of solid node bonding material are placed on those elevated surfaces and they are bonded by heat and pressure, using methods and equipment described in U.S. Pat. No. 4,957,577 or U.S. Pat. No. 5,139,596, both incorporated herein by reference, the solid bonding material being heated to a temperature above its softening temperature to cause the softened node material under pressure to extend around the surface fibers of the corrugated layers. The layers are then cooled and the pressure is removed, resulting in a honeycomb structure.

BRIEF DESCRIPTION OF THE DRAWINGS

FIG. 4A is a perspective view of cloth with polymeric strands woven at 45°;

FIG. 4B is a perspective view of a solid polymeric strip formed, e.g., by extrusion or the like;

FIG. 4C is a perspective view of an open polymeric web or net;

FIG. 4D is a perspective view of polymer coated glass strands;

FIG. 4E is a perspective view of side-by-side, parallel, polymer filaments formed, e.g., by spinning or extrusion;

FIG. 4F is a perspective view of cloth polymeric strands woven at 90°;

DESCRIPTION OF THE PREFERRED EMBODIMENTS

Figure 1:
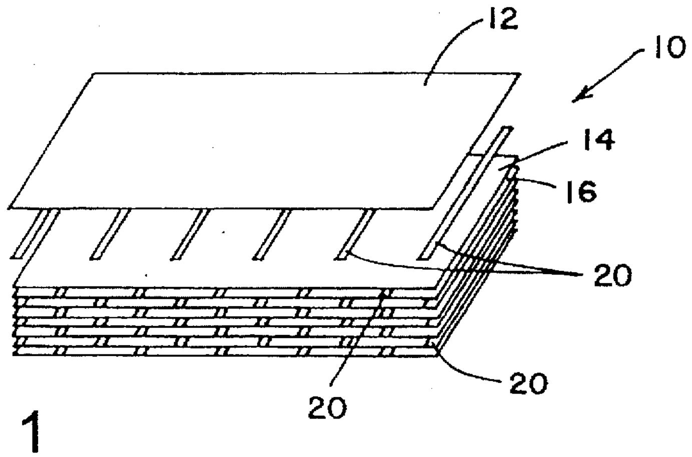
FIG. 1 is a perspective view of one step of a general showing of a process according to this invention, namely layering of solid strips of nodal bonding material with intermediate substrate layers, when using the expansion technique.
Figure 2:
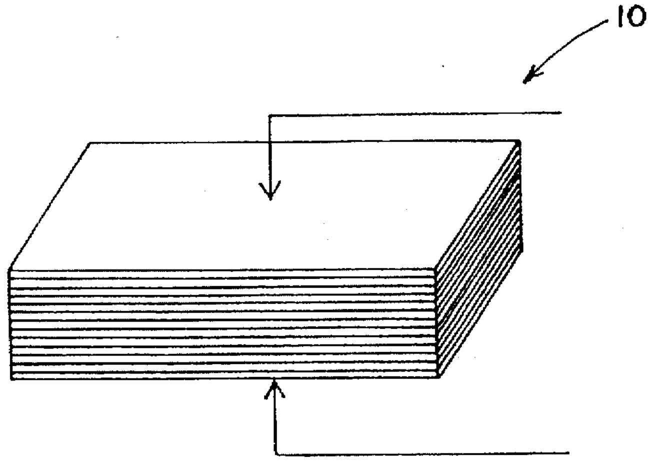
FIG. 2 is a perspective, partially diagrammatic view of another step of the process of FIG. 1, namely the application of heat and pressure.
Figure 3:
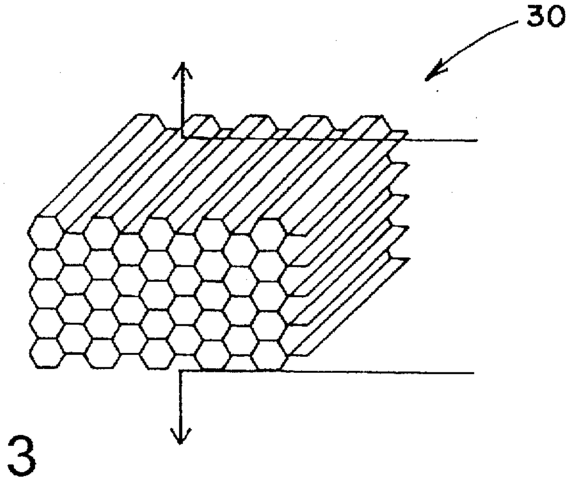
FIG. 3 is a perspective view of a further step of the process in FIGS. 1 and 2, namely the expansion of the honeycomb.

Referring now specifically to the drawings, FIGS. 1–3 depict basic process steps in forming a honeycomb by the expansion technique and according to the concept herein. FIG. 1 illustrates a composite 10 which is formed of a plurality of individual layers 12, 14, 16 et seq. These layers are shown to be sheets cut to length as from a coil or web of stock. The layers are of foils, film and porous, fibrous woven or nonwoven materials, including but not limited to glass cloth, glass mat, aramid paper, wood pulp paper, cotton cloth, polyester cloth, polyester, polypropylene and/or polyethylene spun bonded materials, having fibers on the surfaces thereof, or films of polyetherimide, polycarbonate, polyetheretherketone, or polyether-sulfone. Using the novel technology, it is not necessary to preimpregnate fibrous layers in order to avoid bonding of the layers into an unexpandable block or mass. These materials should be strong enough to withstand the forces imposed during the subsequent expansion process, and have the capacity of not being softened, degraded or deteriorated at the softening temperature of the node bonding material to be described. Optionally, each layer, or some layers, may be formed of a laminate of more than one sheet such as a thermoplastic film between a pair of fibrous sheets, with the exposed surfaces being fibrous or on both sides of a fibrous sheet. Woven fabrics which may be used include fiberglass cloth of various weaves, weights and grades, one example being 108 E Glass from supplier Clark & Schwebel; woven plastics such as polypropylene, nylon, polyetherketone, polyetheretherketone, polyetherimide, polyesters, aromatic polyamides and aramids; woven cotton or other cellulose fibers; carbon fiber cloth; and others. Nonwoven fabrics which may be used include glass mat, polyester fiber, polypropylene fiber, polyethylene spun bonded material and others. Combinations of the above materials may be in laminated form or preimpregnated with polycarbonate, for example, or paper laminated with polypropylene, for example.

This node bonding material is either a solid thermoplastic or reinforced thermoplastic substance which can be softened without melting, i.e., have a distinctly different and lower softening temperature relative to a melting temperature thereof, separated by at least several degrees. Examples of such materials with particularly widely differential temperatures are polyetherimide with a Vicat softening point of about 426° F. and a melting temperature of about 620° F., and polyethersulfone with a Vicat softening temperature of about 438° F. and a melting temperature of about 620° F. Preferred operating temperatures of the node strips in this temperature range are about 500°–55° F. The solid node bonding material is denominated as thermoplastic herein, it being understood that a partially cured thermoset material can behave like a thermoplastic. Therefore, the term solid thermoplastic strips used herein is intended to encompass solid, partially cured thermosetting strip materials which will soften under heat and pressure. The term strip is used to include that which is a unitary solid as well as solid woven, nonwoven, strands, web and spun bonded material et al. This node bonding material is formed into strips 20 which are placed on the layers in a manner spaced from and parallel to each other on each layer, and spaced from, parallel to and alternatingly offset laterally from any strips which are thereabove and therebelow. Thus, strips 20 on sheet 14 are not only parallel to each other, but are laterally offset to lie midway between the underlying strips on layer 16, for example, and aligned with the strips on the layer below layer 16 etc. The spacing of strips on each layer determines the diameter width of the honeycomb cell to be formed. The width of each strip determines the width of the wall connection to the adjacent cell. This solid thermoplastic node bonding material may include, but is not limited to, one or more of polyethylene, polypropylene, polycarbonate, polyetherimide, polyethersulfone, polyethylene, polyetheretherketone and polyurethane materials. Each of these strips can be in a variety of forms, e.g., a solid homogeneous unitary thermoplastic strip, a group of solid thermoplastic filaments, strips of solid thermoplastic impregnated cloth, solid thermoplastic-coated glass filaments, expanded thermoplastic film or unexpanded thermoplastic film. Some of these forms are most readily created by extrusion, either earlier or in situ.

Figure 4A:
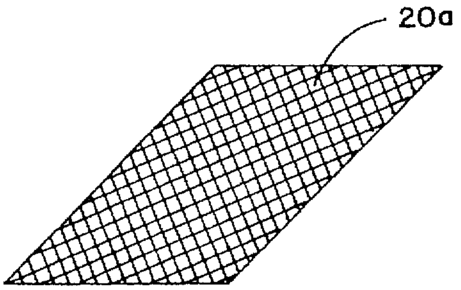
FIGS. 4A–4F are perspective views of alternative polymeric node strip characteristics exemplary of those useable with this invention, specifically.
Figure 4B:
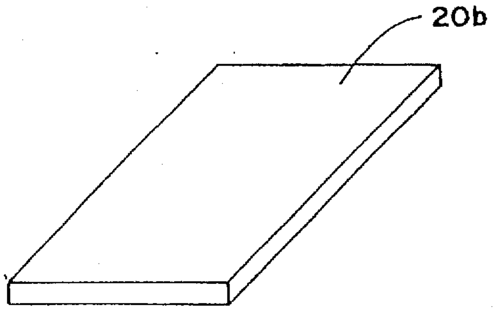
Figure 4C:
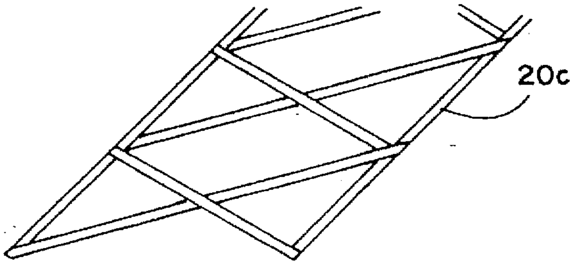
Figure 4D:
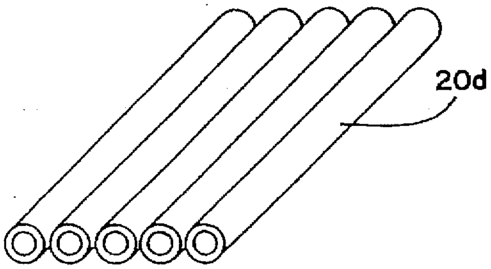
Figure 4E:
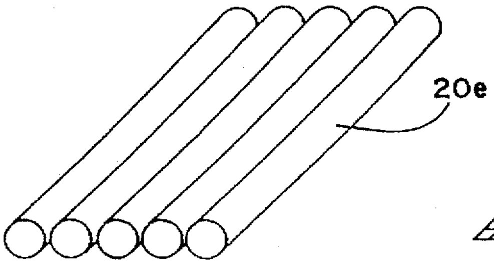
Figure 4F:
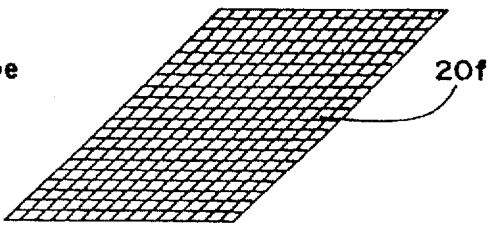

The node strips can be unreinforced or reinforced. The orientation of the reinforcing fibers can be varied in arrangement to obtain a variety of structural properties. Reinforcing materials may be fiberglass, Kevlar®, carbon fiber, quartz fiber, polyester fiber, or any other material that may be laminated, commingled, coated or impregnated with a thermoplastic resin. The form of the solid node polymer strips can vary, including but not limited to nonperforated, perforated, expanded webbing, nonexpanded webbing, linear, woven or random filaments or fibers, and polymer coated glass filaments or fibers. In FIGS. 4A–4F are illustrated some examples of these potential strip forms. FIGS. 4A and 4F show woven cloth forms of strips, with 20A being diagonally woven polymeric strands and 20F being crosswise woven polymeric strands. Form 20B in FIG. 4B is shown as solid polymer, e.g, extruded, in unitary form. Form 20C in FIG. 4C depicts a net or web formed of individual strands in a pattern. Form 20D in FIG. 4D is formed of a series of polymer coated glass strands in a pattern. Form 20E in FIG. 4E depicts a group of polymeric filaments or strands lying side-by-side in parallel fashion. Similarly, the strips can also be formed of polymeric threads commingled with other filament materials.

The individual strips can be applied in continuous form to a web by heating and fusing a plurality of controls, spaced strips to a web layer of base materials on a web handling line, so that the resulting strips and web can be coiled up for further processing at a later date, e.g., later cut into sheets and short strips, and stacked on each other. Alternatively, the solid thermoplastic node material may be applied at the time of sheeting from a web. In either case, the fibrous base substrate is cut to length, and is laid down with alternating layers of node material, the node strips oil successive sheets being laterally offset to be midway between the node strips on the sheet immediate thereabove and the sheet immediately therebeneath.

Each layer may be pressed and heat fused individually to the node strips on one other layer, or alternatively a stack of a plurality of layers and intermediate node strips can all be pressed and heated at the same time, as shown in FIG. 2, the arrows graphically depicting the applied pressure. Thus, the layup can be with one press cycle, or a series of sequential press cycles.

A one press cycle sequence is set forth in more detail as follows:

1. Lay down alternative layers of substrate and solid thermoplastic node material. Repeat as necessary to generate a block of desired size.
2. Place block in a press under sufficient heat to soften the node strips but not sufficient to melt the node strips, and apply pressure to fuse the node material to the substrate layers.
3. Remove the block from the press, cool it to room temperature, and expand it to the desired honeycomb configuration. (This may be sinusoidal, hexagonal, or rectangular.)
4. Where possible, heat set the block to maintain the expanded shape.
5. When desired, the expanded block may be dipped in uncured thermosetting resin, then cured to achieve desired weight and strength characteristics.

Sequential press cycles are as follows:

1. Place the node strips in parallel spaced fashion on the topmost layer of substrate, offsetting the nodes from any previous layer.
2. Place another layer of substrate on top of the above noted layer of node strips.
3. Fuse the nodes to the substrate layers by pressing them under heat and pressure sufficient to soften the node strips. Repeat steps 1, 2 and 3 as necessary to achieve the desired block size. (This eliminates the need for a lengthy press cycle later.)
4. Expand the block to the desired cell configuration.
5. Where possible, heat set the block to maintain the expanded shape.
6. When desired, the expanded block may be dipped in thermosetting resin, then cured to achieve desired weight and strength characteristics.

When the material is pressed and heated, the temperature of the solid node bond material strips should be elevated sufficiently to equal or exceed the softening temperature of the strips. The particular strip polymer used should normally be characterized by a distinct difference between the softening and the melting temperatures thereof. The heat and pressure applied cause the softened portions of the polymer node strips to be forced around surface fibers of the fibrous sheet stock for bonding thereto. In the case of unreinforced node strips and unreinforced substrates, the heat of the node strips has to be able to soften the substrate sufficiently to cause fusion with the node strip when under pressure. The particular pressure and temperatures will be selected to suit the particular materials used for the node strips and substrates. Consequently, when the product is subsequently cooled and the pressure is removed, the node adhesive and the substrate, especially the fibers of a fibrous substrate, interlock, resulting in a strongly bonded, laminated structure, with sequential layers being bonded at alternating, linear node intervals.

This bonded structure is then expanded by any conventional expansion technique to result in a honeycomb structure. This expansion is graphically depicted in FIG. 3, with the arrows representing an opposite outward pulling action to produce honeycomb core 30.

Subsequently, the honeycomb structure can be dipped or otherwise coated in thermosetting polymer, e.g., a phenolic resin, which is uncured, followed by curing thereof to rigidify the structure and prevent subsequent collapse. The particular type and amount of thermosetting polymer applied to the honeycomb will depend upon the ultimate properties and uses desired. The thermosetting polymer is cured by heat in a known conventional fashion.

The production manner in which the node material is applied to the substrate layers can vary widely, with several representative apparatuses and processes being set forth herein as the preferred ones.

Figure 5:
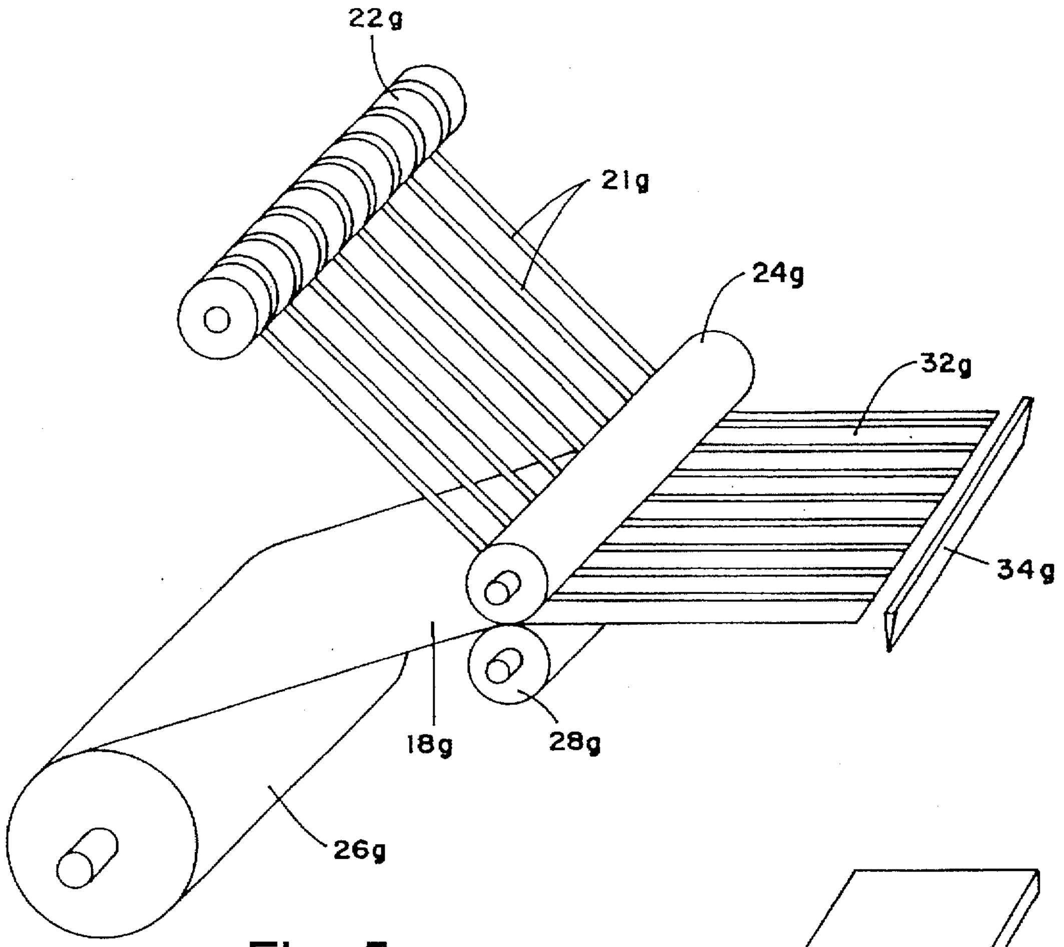
FIG. 5 is a perspective view of an in-line web and continuous in-line strips being applied to the web.
Figure 6:
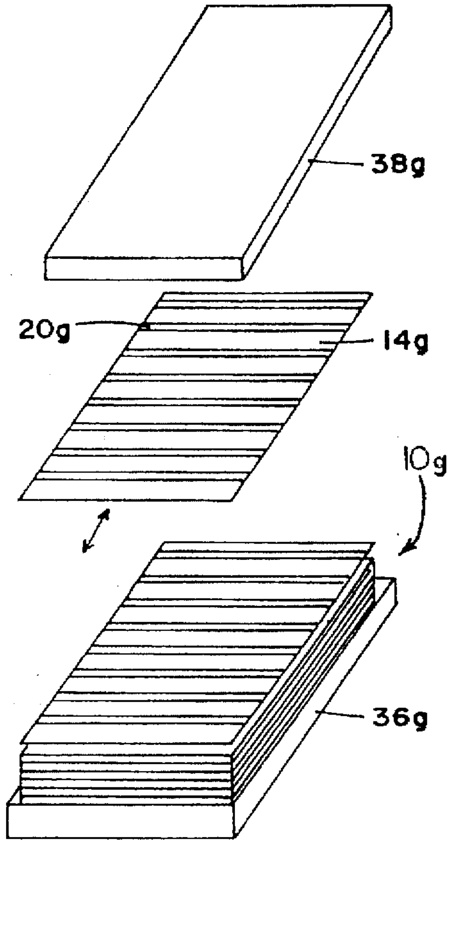
FIG. 6 is a perspective representation of sheets of substrate and strips, cut from the continuous web and strip ribbons of nodal material in FIG. 5, the cut sheets and strips shown being stacked.

Referring first to the showing in FIGS. 5 and 6, the plurality, here eight, of continuous thermoplastic strips 21G are here shown to be unwinding from a like number of spools 22G. These strips can be, e.g., of tape, being spaced from and parallel to each other as they pass around work roll 24G to engage a generally continuous fibrous web 18G from web coil 26G as the web passes around work roll 28G. The continuous strands 21G are heated and pressed against web 18G as the strips and web pass between the cooperative, squeezing work rolls 24G and 28G to produce the combination 32G of fibrous web and thermoplastic strips adhered to one side of the web. Successive portions of this combination web and strips can be severed into sheets 14G by a suitable cutter 34G such as a guillotine blade, a water jet, or other known cutting devices. The cut portions or segments have spaced nodal strips 20G, with the successive sheets being placed one on top of another, but each being laterally offset relative to the one therebelow by an amount equal to one-half of the spacing between the individual parallel strips 20G of node material. As the thermoplastic strips are paid out from spools 22G and meet the web paid out from coil 26G, and both pass between rollers 24G and 28G, the roller 28G engaging the back side of the web is preferably maintained at a temperature sufficiently above the softening temperature of the thermoplastic node material to heat the node strips above that temperature and cause adherence thereof to the web, while roller 24G is purposely maintained at a lower temperature in order to prevent sticking of the node material to this roller. The node material is normally not heated above the melting temperature of the material to limit flow of resin into the web. When the multiple of sheets with the strips applied are placed in a stack as noted above, resting upon a support such as a lower press platen 36G, heat and pressure are applied to the stack, as with an upper platen 38G, sufficient to soften the node strips, causing the softened node material to penetrate the surface fibers of the adjacent sheet. After cooling, this forms a block 10G to be subsequently expanded into a honeycomb structure. Alternatively, the web with the thermoplastic node material bonded to it could be coiled up for storage, shipment and processing at a later date, rather than immediately being cut into sheets and stacked into an unexpanded block.

Figure 7:
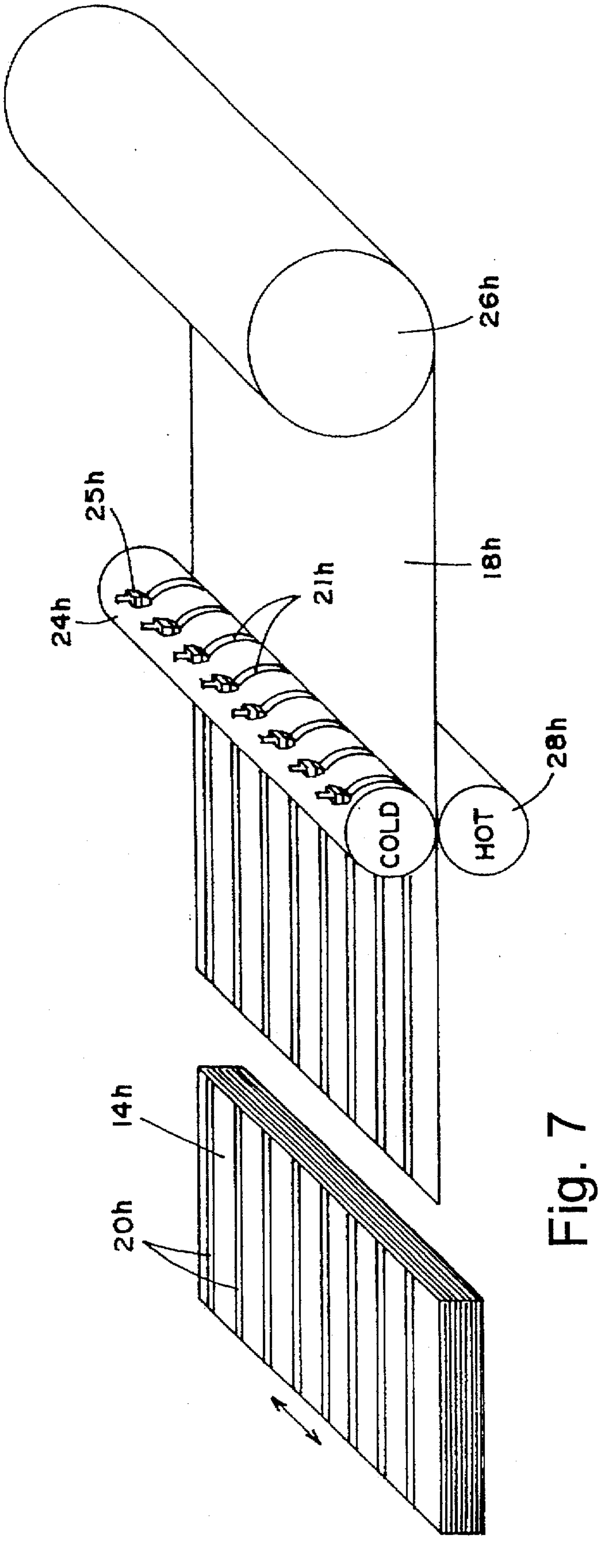
FIG. 7 is a perspective view of an in-line web and extruded in-line strip ribbons, each strip ribbon optionally formed of multiple strands as depicted in FIG. 8.
Figure 8:
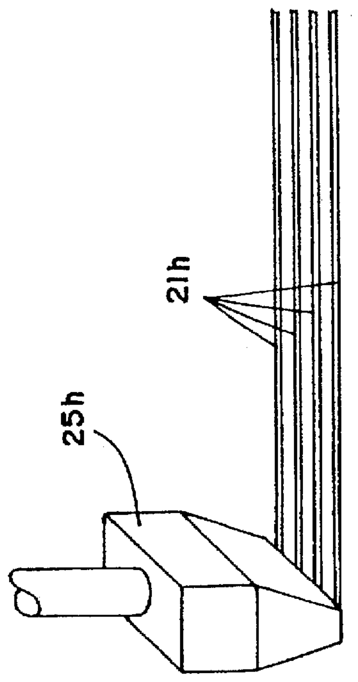
FIG. 8 is an enlarged perspective view of one of the extrusion heads in FIG. 7, shown forming several (four) strands of a strip.

In FIGS. 7 and 8 is disclosed an in-line web arrangement wherein the individual strips of node bonding material are formed in situ from extruder heads, simultaneously with advancement of the web. Specifically, web 18H is paid off web coil 26H and advanced between a lower, heated, press roll or work roll 28H and a cooperative, upper, cool, press roll or work roll 24H. Simultaneously, a plurality of conventional extruder heads 25H positioned in side-by-side fashion, spaced from each other along the width of the web stock 18H and along the length of roll 24H, extrude spaced strips 21H of node bond material, which solidify after extrusion onto the cool or cold roll 24H, to travel therearound in spaced parallel fashion for bonding to web 18H as the two pass between the press rolls 24H and 28H and are heated. In FIG. 8, the extruder heads 25H are shown to be extruding a plurality of, here four, strands which together form a strip 21H. The resulting web with bonded strips can be rolled into a coil for later sheeting, or can be sheeted into individual sheets 14H having parallel solid node strips 20H adhered thereon. When stacked, each individual sheet is laterally offset relative to the sheet therebelow and the sheet thereabove, an amount which is one-half the spacing between strips 20H, so that the node bond material is in alternating arrangement as depicted in FIG. 3.

Figure 9:
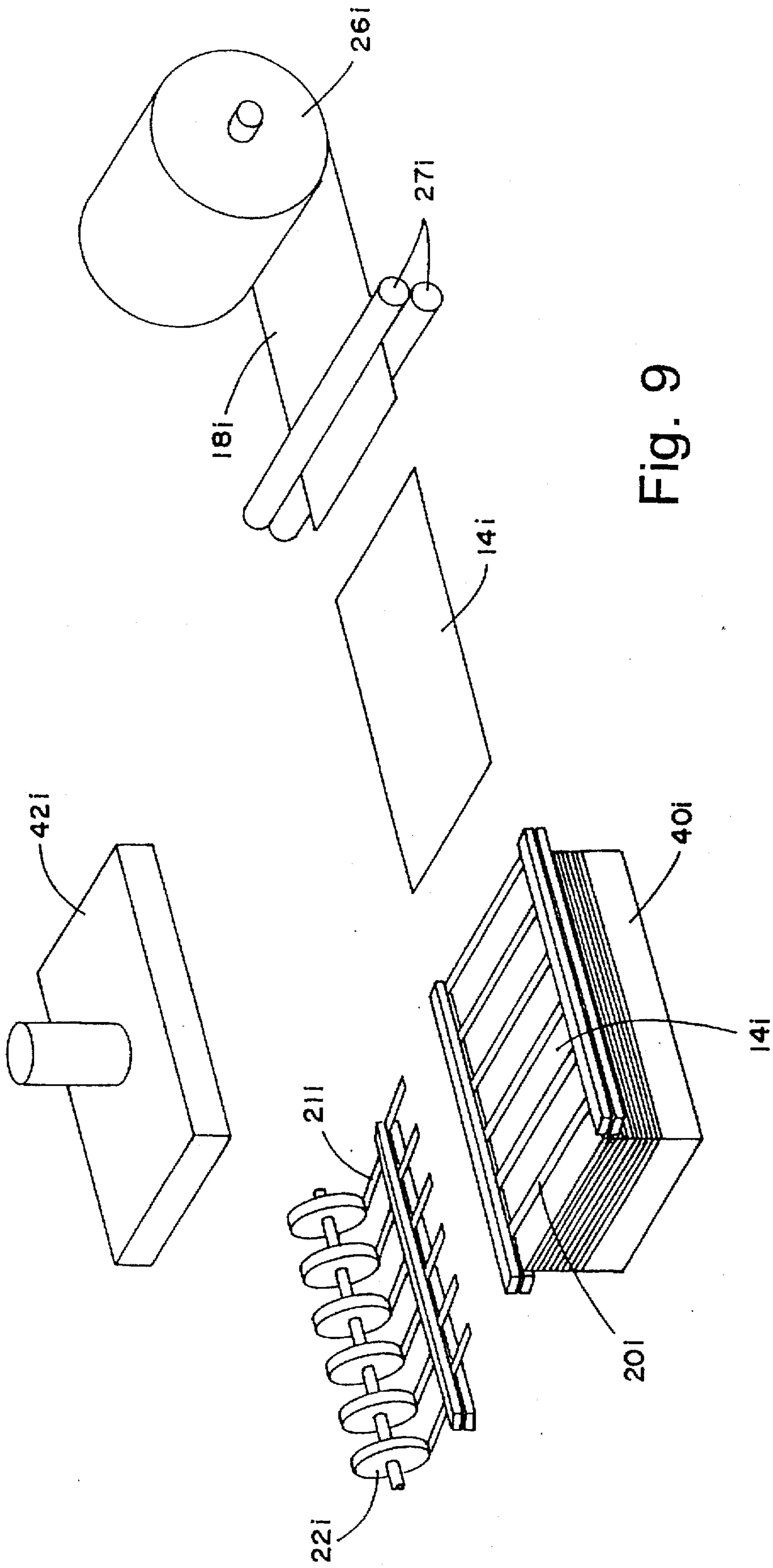
FIG. 9 is a perspective view of press apparatus and a plurality of strips being applied cross line to substrate sheets cut from a web.

In FIG. 9 is shown another alternative technique and apparatus for forming the substrate and node strip combination, thus forming the honeycomb block to be expanded. In this instance, a cross-line sheeter is employed. More specifically, a web 18I is advanced from web coil 26I as by a pair of draw rolls 27I and severed into individual sheets 14I, as by a blade or the like, which sheets are to be advanced into a stack of sheets. On each sheet a plurality of transversely oriented strips 20I are applied in spaced parallel fashion. These nodal strips on each sheet are offset relative to the node strips immediately therebeneath an amount which is one-half the spacing between the strips. The stack of sheets and strips is placed on a lower press platen 40I cooperative with an upper, vertically reciprocable press platen 42. These platens can be heated by any suitable means such as electrical resistance elements, internal heated fluid, or a variety of other conventional techniques, for increasing the temperature of the solid node strips 20I. These individual strips are formed from a plurality of spools 22I of continuous strip material 21I.

Figure 9A:
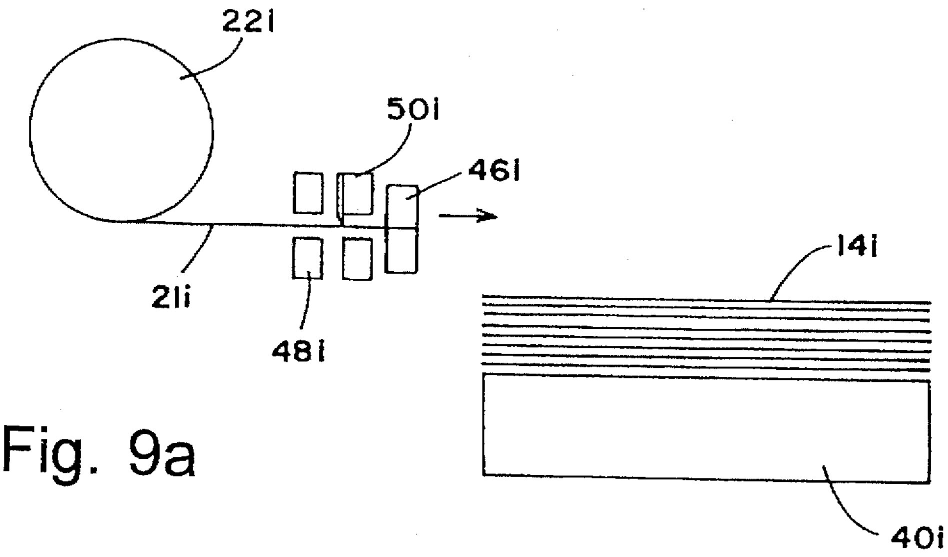
FIG. 9A is a side elevational diagrammatic view of process steps 1 and 2 related to FIG. 9.
Figure 9B:
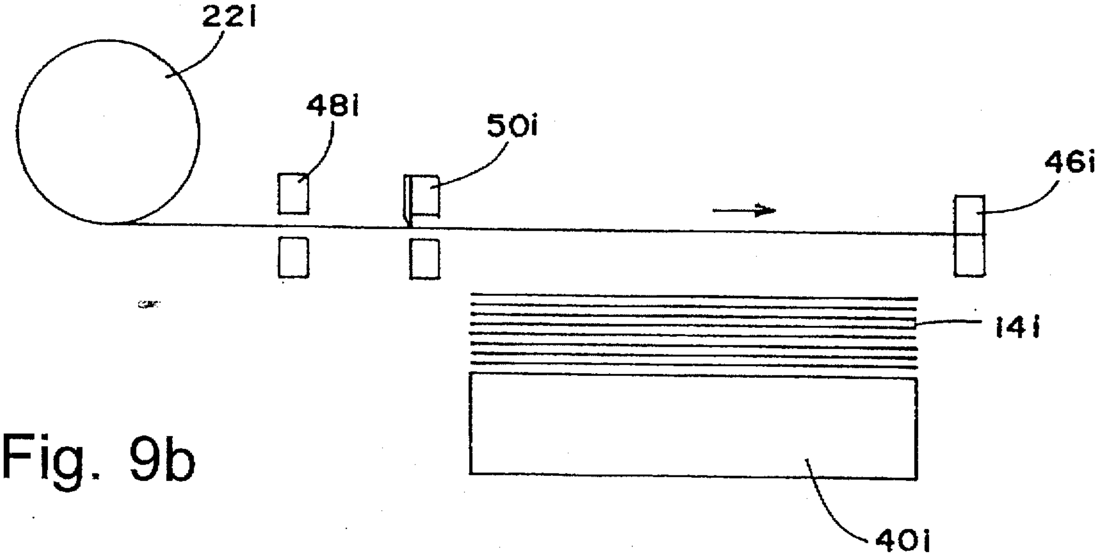
FIG. 9B is a side elevational diagrammatic view of process step 3 related to FIG. 9.
Figure 9C:
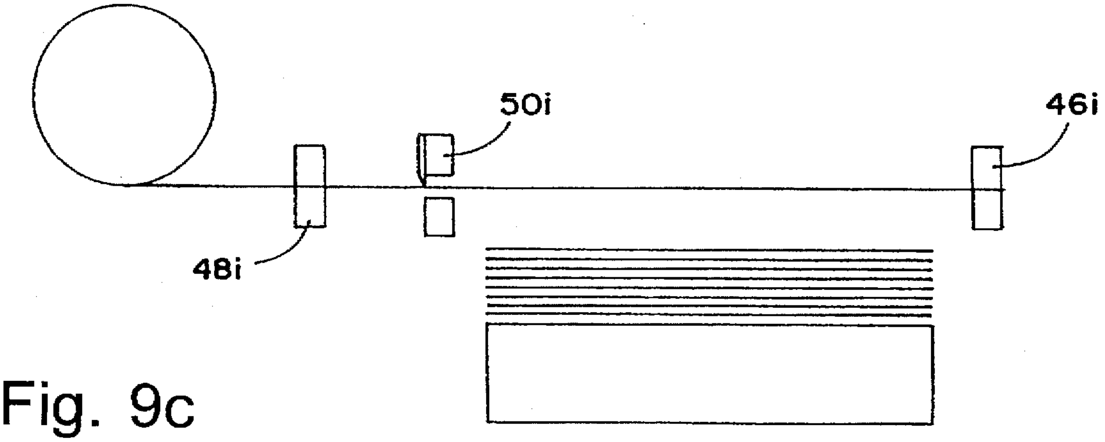
FIG. 9C is a side elevational diagrammatic view of process step 4 related to FIG. 9.
Figure 9D:
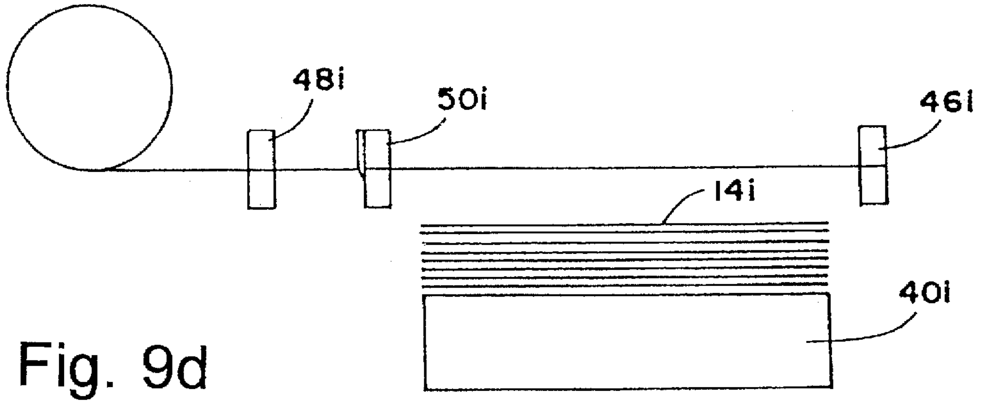
FIG. 9D is a side elevational diagrammatic view of process step 5 related to FIG. 9.
Figure 9E:
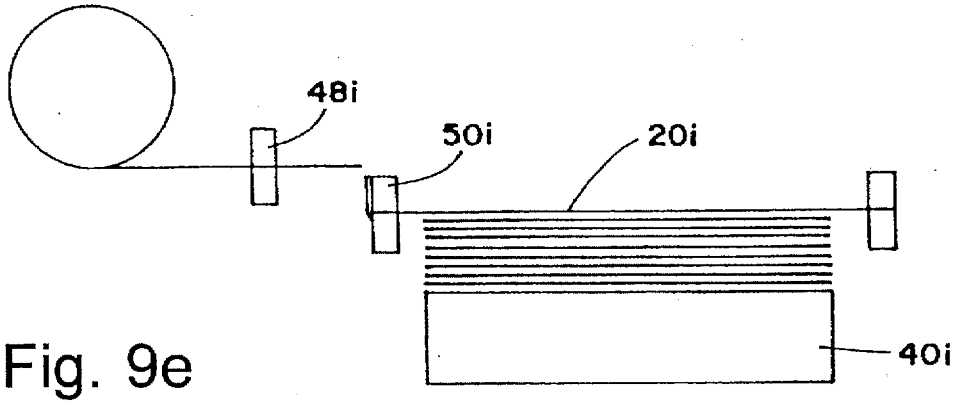
FIG. 9E is a side elevational diagrammatic view of process step 6 related to FIG. 9.
Figure 9F:
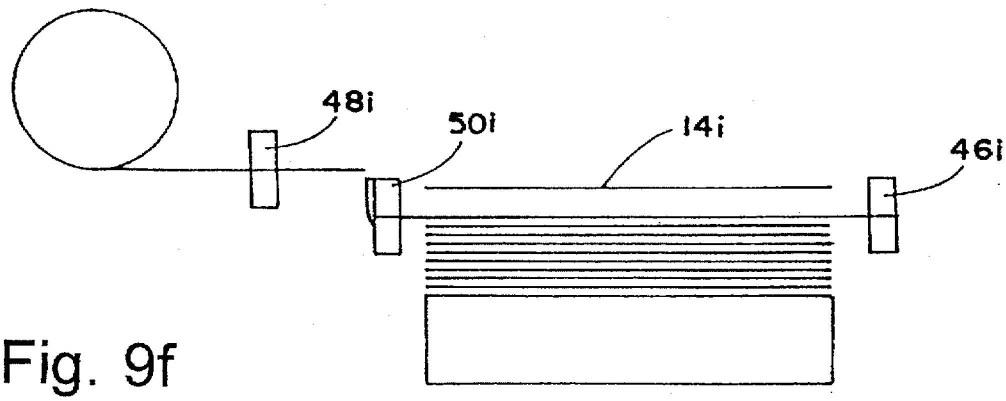
FIG. 9F is a side elevational diagrammatic view of process step 7 related to FIG. 9.
Figure 9G:
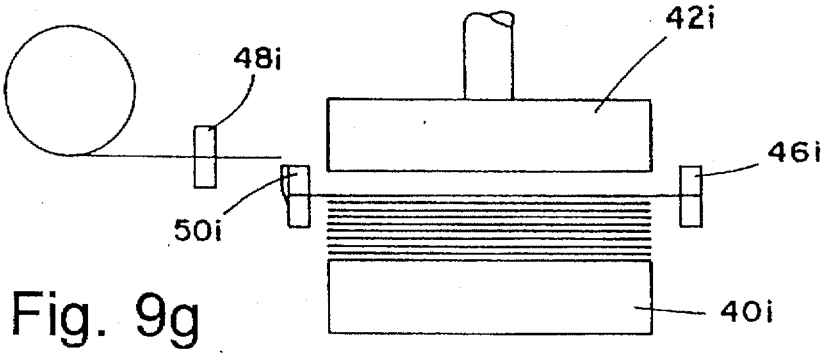
FIG. 9G is a side elevational diagrammatic view of process step 8 related to FIG. 9.
Figure 9H:
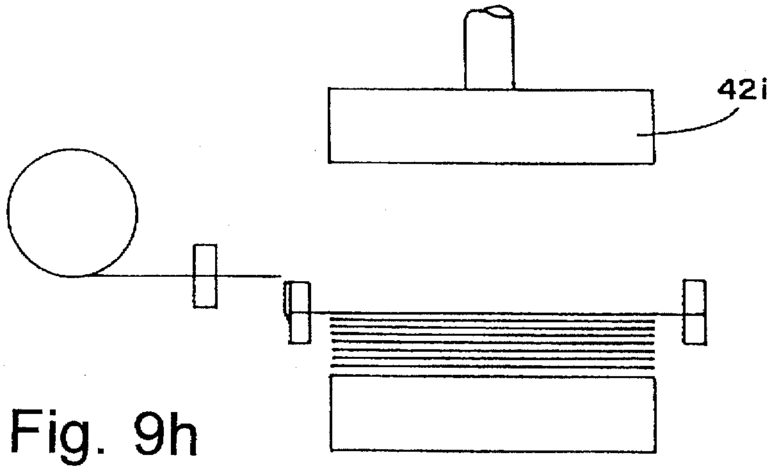
FIG. 9H is a side elevational diagrammatic view of process step 9 related to FIG. 9.
Figure 9I:
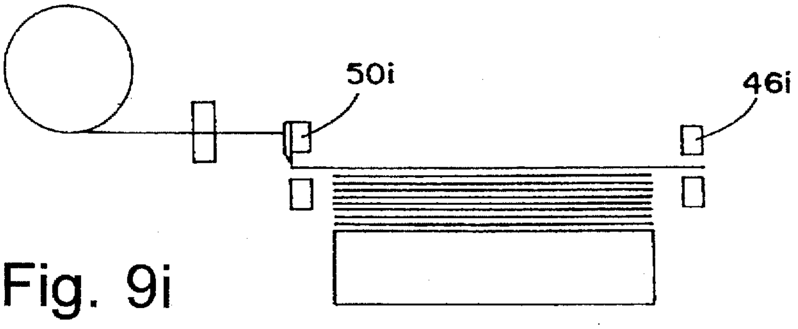
FIG. 9I is a side elevational diagrammatic view of process step 10 related to FIG. 9.
Figure 9J:
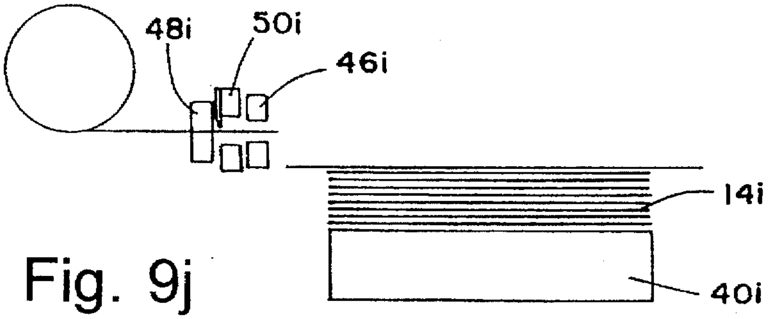
FIG. 9J is a side elevational diagrammatic view of process step 11 related to FIG. 9.

FIGS. 9A–9J illustrate the steps of the individual strips of nodal material being applied to the surface of the fibrous sheets. Referring first to FIG. 9A, a first pair of strip grippers 46I secure the ends of the strips 21I on one side of the stack of sheets 14I and, as illustrated in FIG. 9B, are moved across the stack of sheets to the opposite side thereof to extend the strips thereacross. Then the second pair of strip grippers 48I clamp the strips at the first side of the stack as in FIG. 9C, and the adjacent cutoff knife 50I is vertically actuated relative to its cooperative anvil to sever a length of the continuous strips to form the nodal strips 20I which are then lowered onto the sheet stock 14I (FIG. 9E), after which another sheet 14I is applied atop the strips (FIG. 9F). Following this action to form the desired layer thickness, upper platen 42I is lowered so that heat and pressure are applied to the strips and sheets between platens 40I and 42I to soften the nodal strips and cause them to flow around fibers on the surface of the sheets. The upper platen is then retracted (FIG. 9H), after which the clamping knife 50I is separated from its anvil (FIG. 9I), as well as grippers 46I being separated, after which grippers 46I are returned to the initial position for the next cycle (FIG. 9J). The tag ends of the strips can be removed by any desired technique.

In FIGS. 10–15 are shown other structures and methods of forming the composite for the honeycomb block. One technique is cross stringing, shown in two versions in FIGS. 10–13 and FIGS. 14–15. Specifically, referring first to FIGS. 10–13, web 18J is paid off coil 26J to pass between a pair of cooperative lower and upper rolls 28J and 24J to press the strands and web together, with lower roll 28J being heated above the softening temperature of the nodal strips, and upper roll 24J being cool. The strands of parallel, solid, polymeric, continuous nodal material are advanced along the length of tipper roll 24J by draw pins 24'J which move along longitudinal slots in roller 24J as driven by internal advancing mechanism. This pulls the strand crosswise of the web. The filament material 27J forming the strands is fed off a spool 29J and advanced to a plurality of stationary guide pins 31J (FIG. 11) which extend around the periphery of cylinder 24J, spaced from each other, and projecting radially outwardly from the end of cylinder 24J adjacent spool 29J. The strand 27J thus is peripherally advanced during rotation of cylinder 24J, as well as axially extended by the stringing pins, such that when the peripheral portions of the cylinder reach web 18J, the doubled strand is basically extended substantially the full length of cylinder 24J to extend substantially across the width of web 18J. Engagement of the web and the doubled strand between the two cylinders or rolls 24J and 28J presses the doubled strand against web 18J, with the temperature of the hot lower roll 28J increasing the temperature of the solid strand sufficient to soften it, causing the strand to bond to web 18J and form a strip.

As an alternative to rolls 24J and 28J are the rolls 30J, 34J and 32J. The web is advanced past heated rolls 30J which press it against a central heated work roll 32J (in place of roll 28J) and then past a pair of cold rolls 34J pressing it against work roll 32J as shown in FIG. 12.

Figure 13:
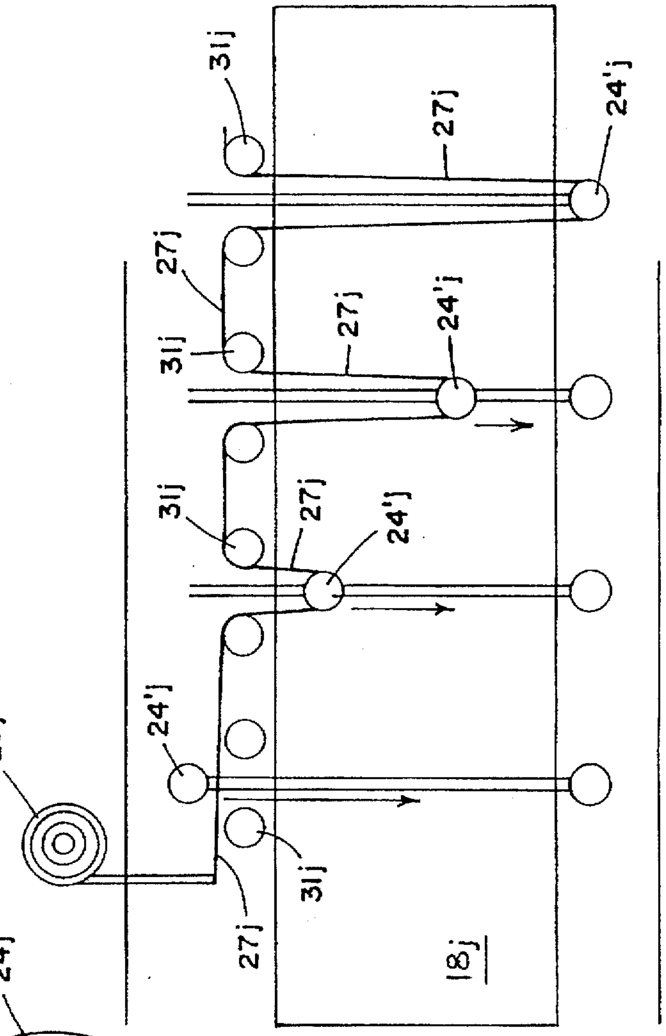
FIG. 13 is an enlarged, plan, projection view of a portion of the applicator in FIG. 10, shown as a planar, cross line strand and sheet applicator.

The following series of pins 24'J likewise sequentially advance the succeeding double strand portions to the far end of cylinder 24J, each pin then returning axially of the cylindrical roller back to its starting position to repeatedly engage successive portions of strand 27J coming from spool 29J. The web with the nodal material bonded thereto at spaced intervals can be cut into sheet stock. The sequential operation is illustrated more schematically in projection drawing FIG. 13, showing how the axially advancing pins 24'J draw the strand 27J around stationary pins 31J and over the length of cylinder 24J.

Figure 10:
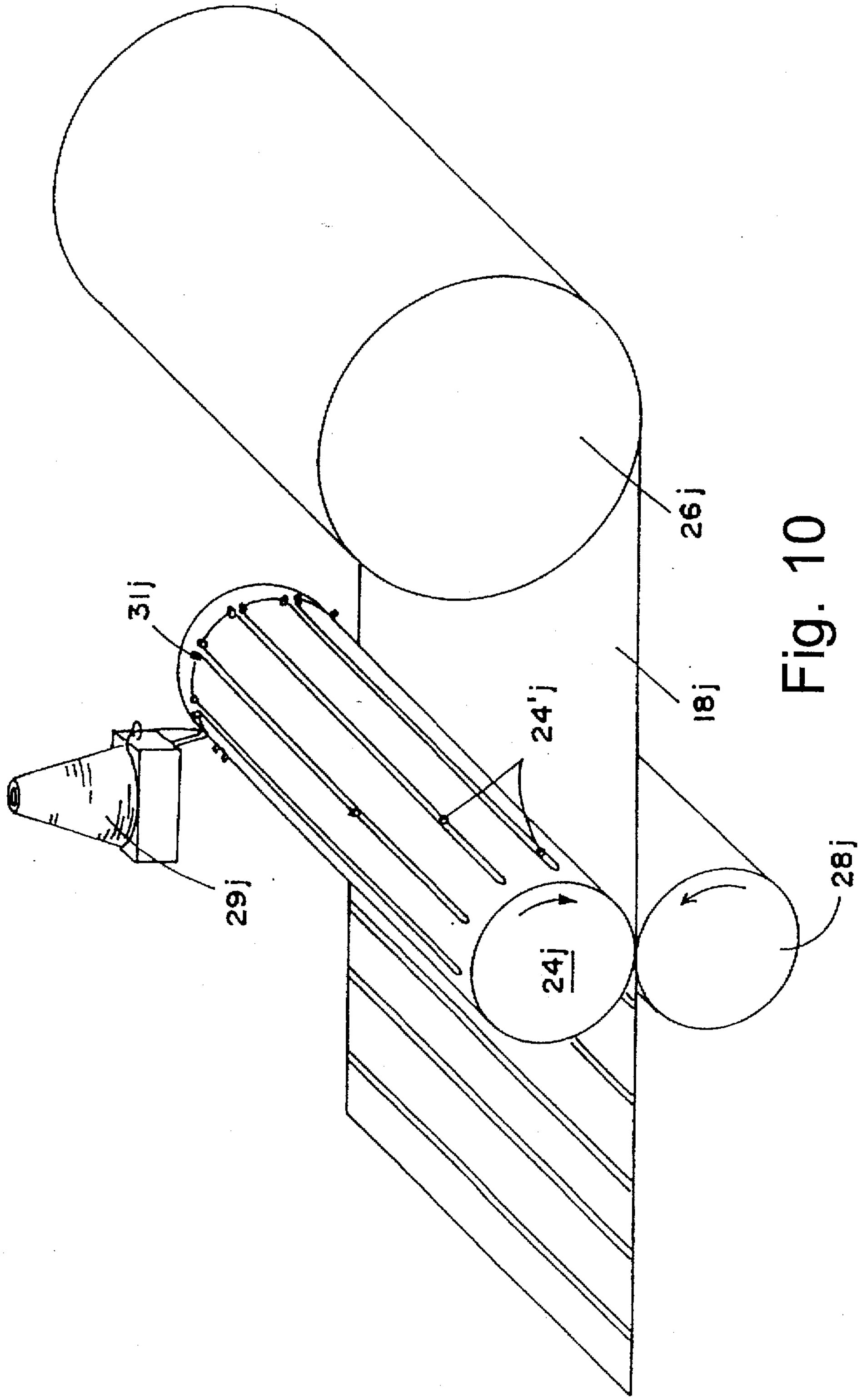
FIG. 10 is an isometric view of a cylindrical, cross-strand applicator onto web substrate stock.
Figure 12:
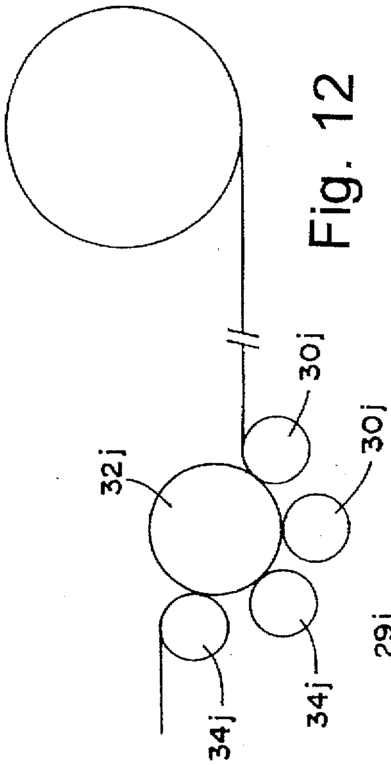
FIG. 12 is an end elevational view of laminating apparatus for adhering the strands of FIGS. 10 and 11 to the web.
Figure 11:
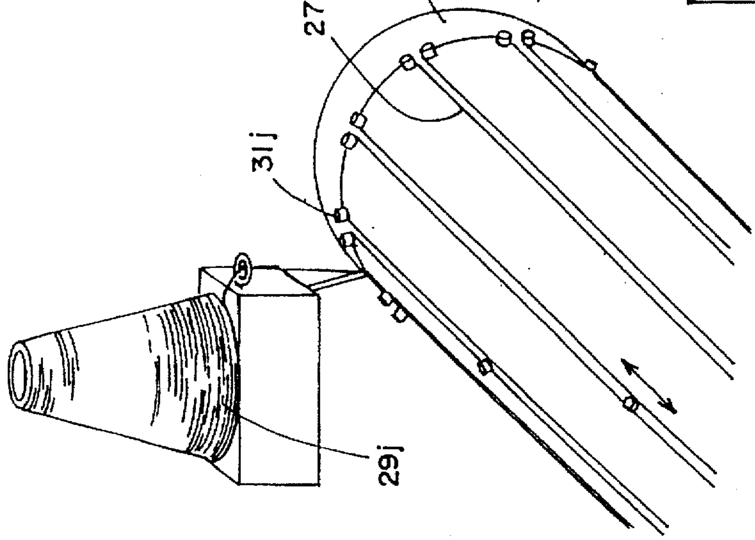
FIG. 11 is an enlarged, partial, isometric view of a portion of FIG. 10.
Figure 15:
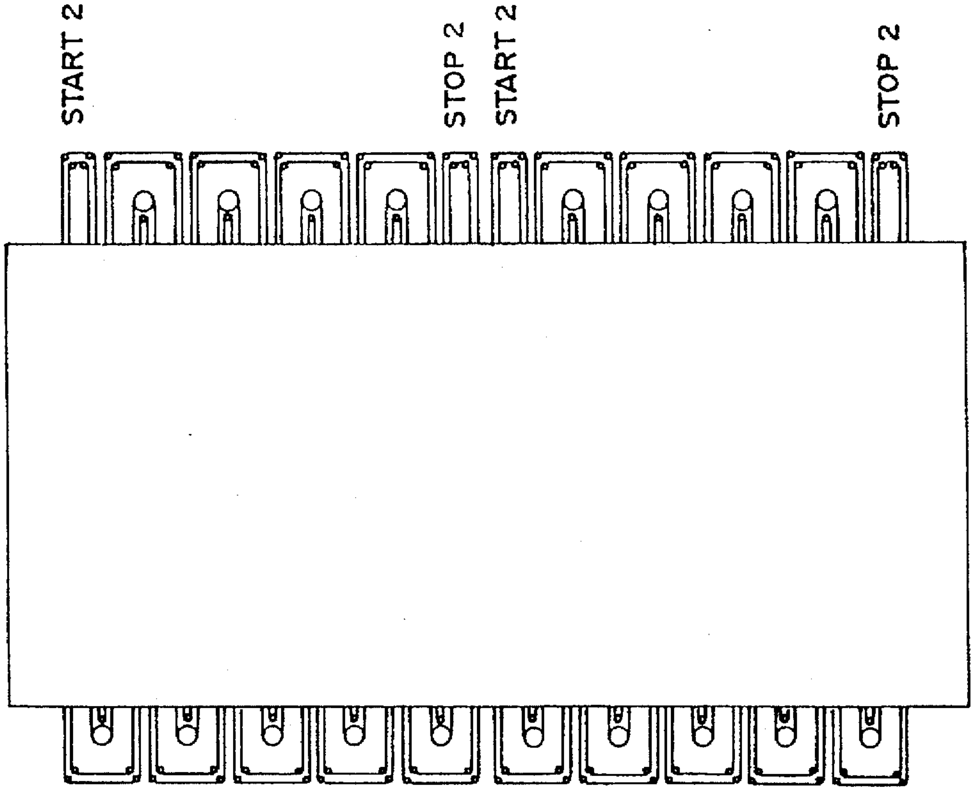
FIG. 15 is a plan view of the opposite side of sheeter and applicator in FIG. 14, with the strands moving in the opposite direction.
Figure 14:
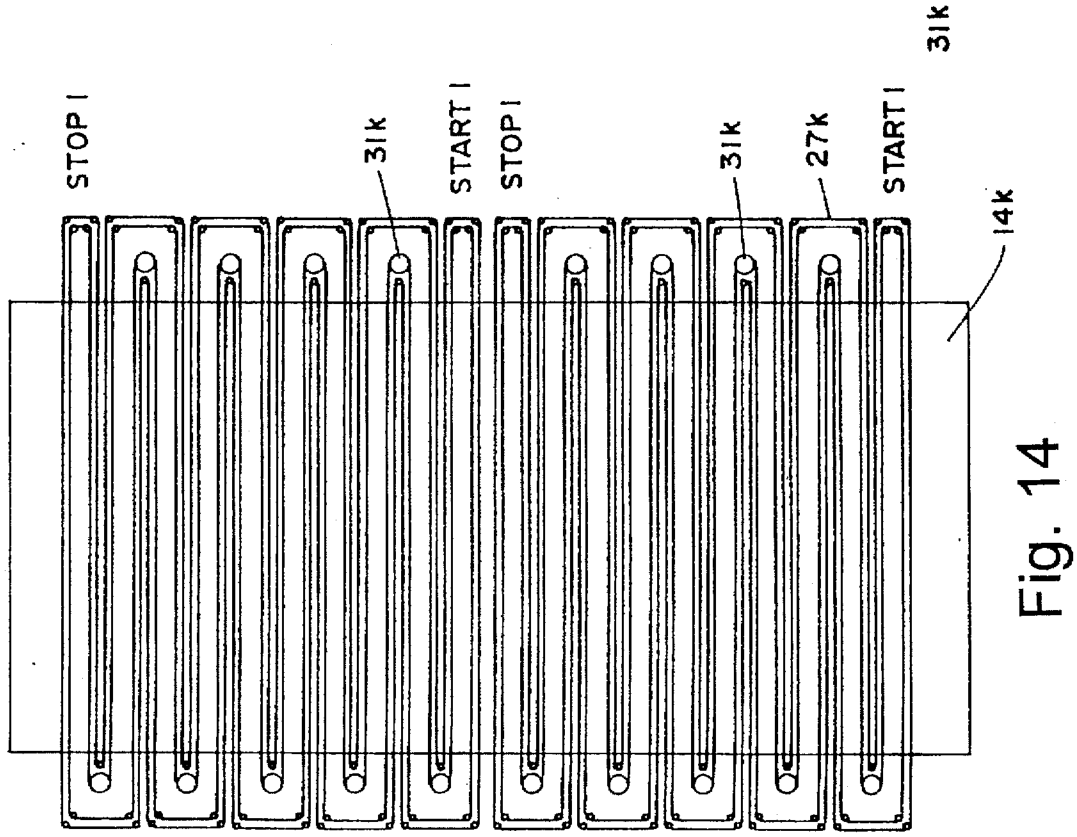
FIG. 14 is a plan view of a double cross line sheeter and strand applicator, moving in one direction.
Figure 16:
FIG. 16 is an end elevational view of the apparatus in FIGS. 14 and 15.

As an alternative to the cylindrical arrangement depicted in FIGS. 10–12, a planar type arrangement can be employed wherein the cross line stringers advance filaments in both directions, i.e., front both sides across the width of the sheet stock, as illustrated in FIGS. 14–16. In this instance, a sheet of fibrous stock material 14K is placed on top of a platen and continuous filaments 27K of thermoplastic node material are laced back and forth around pins 31K adjacent opposite edges of the sheet. Optionally several filaments may be run across the web to add strength and width to the node. The filaments basically define the edges of each of the spaced node lines. After the node lines have all been laced across the web, another sheet of substrate is placed on top of the first sheet and its node strips. Again, filaments are laced back and forth across this sheet, with the second set of pins being offset by one-half of the distance or spacing between the nodes of the previous layer (shown in hidden lines) so that the filament node lines on this second sheet will be midway of the node lines on the underlying sheet. This process of laying down individual sheets of substrate and running filaments around the pins, laying another sheet thereon and repeating the filament run on offset pattern, is continued until the desired number of sheets have been applied to form the block. The block is then pressed under heat and pressure sufficient to soften the nodal thermoplastic and bond the layers together at the desired node locations. The solid block is then cooled and expanded as needed to form honeycomb.

Figure 17:
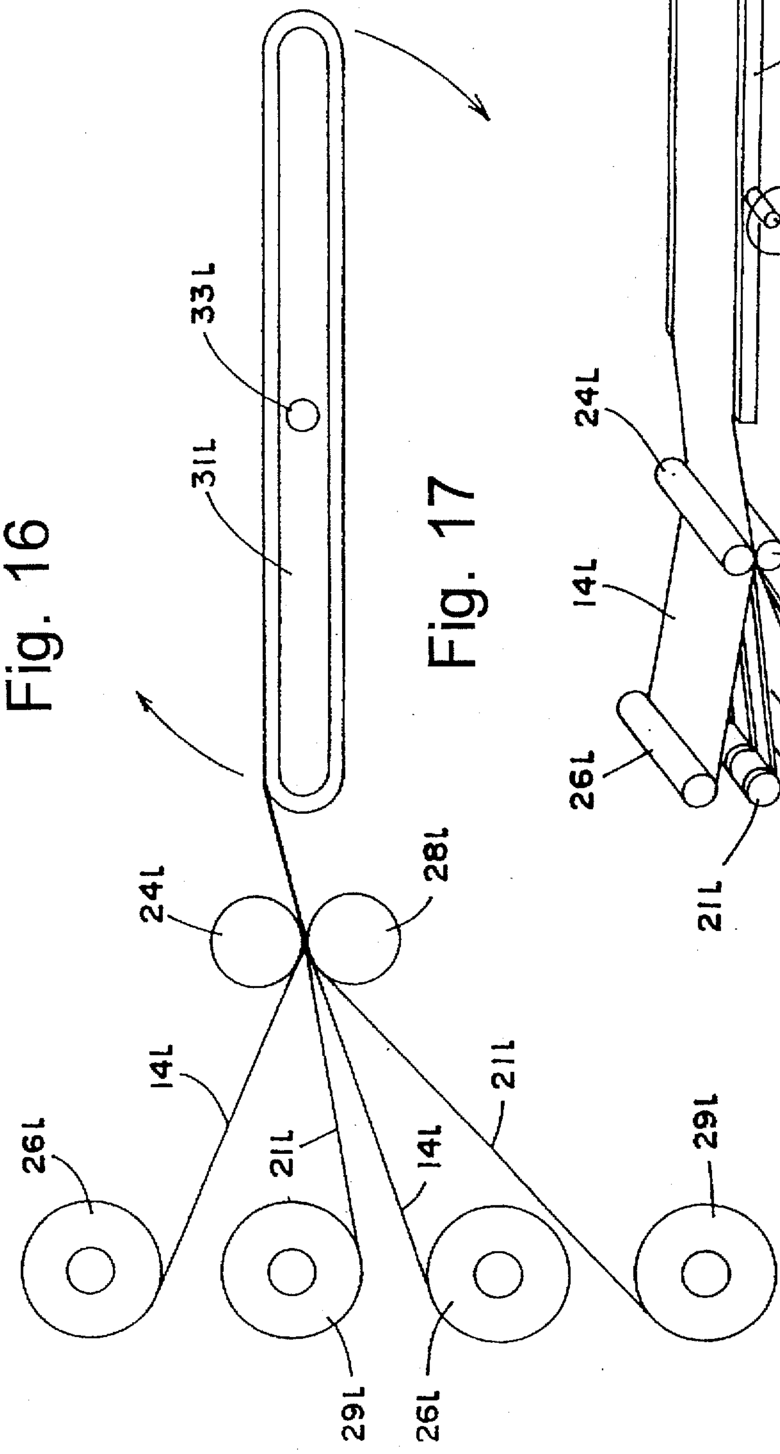
FIG. 17 is a side elevational view of an in-line windup, double side web and node strip apparatus for simultaneously forming two honeycomb blocks.
Figure 18:
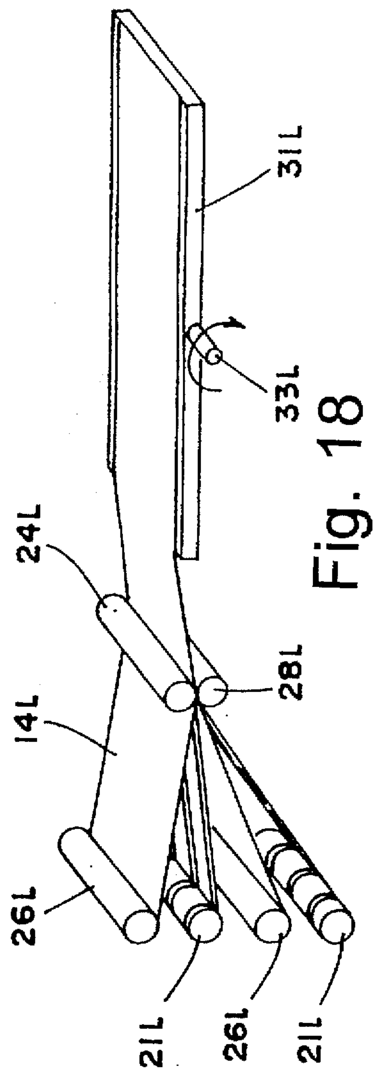
FIG. 18 is a perspective view of the apparatus in FIG. 17.
Figure 26:
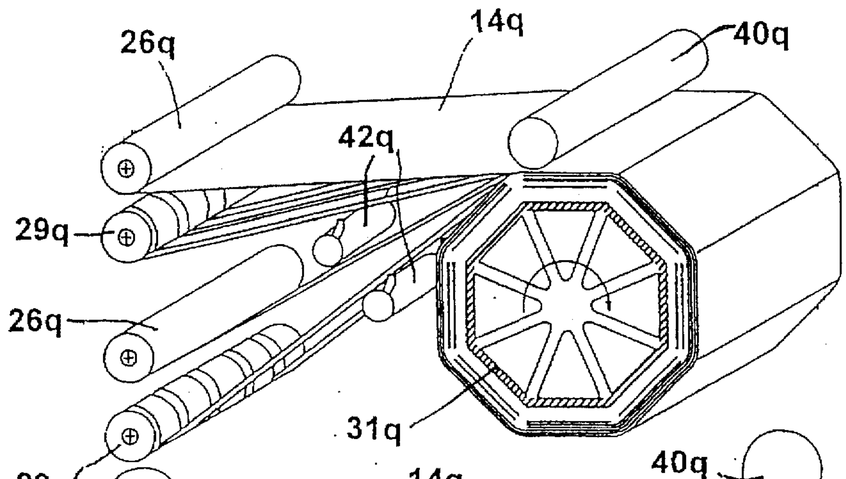
FIG. 26 is a perspective view of an in-line windup, multi-sided web and node strip apparatus for simultaneously forming a multiple of honeycomb blocks.
Figure 27:
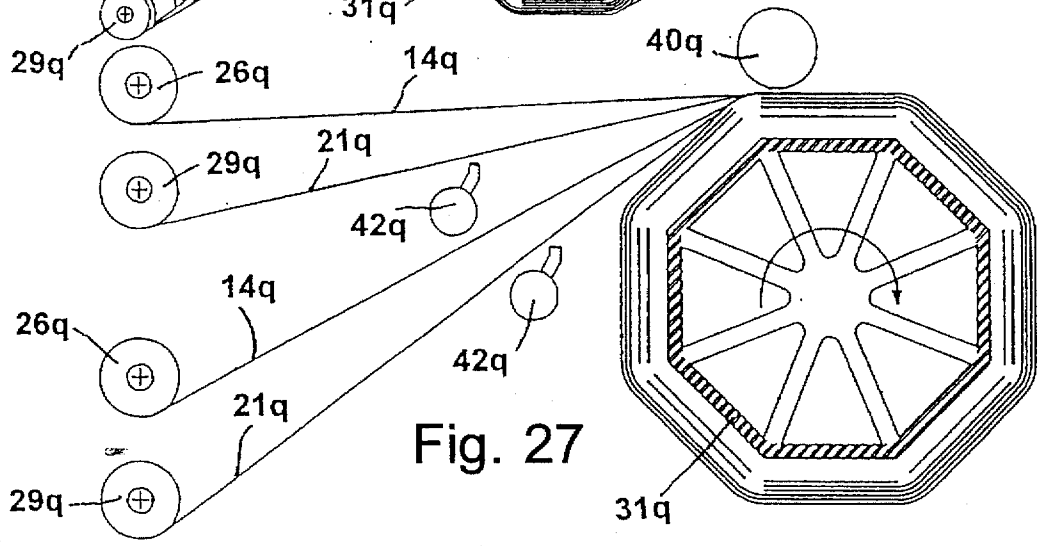
FIG. 27 is an end elevational view of the apparatus in FIG. 26.
Figure 28:
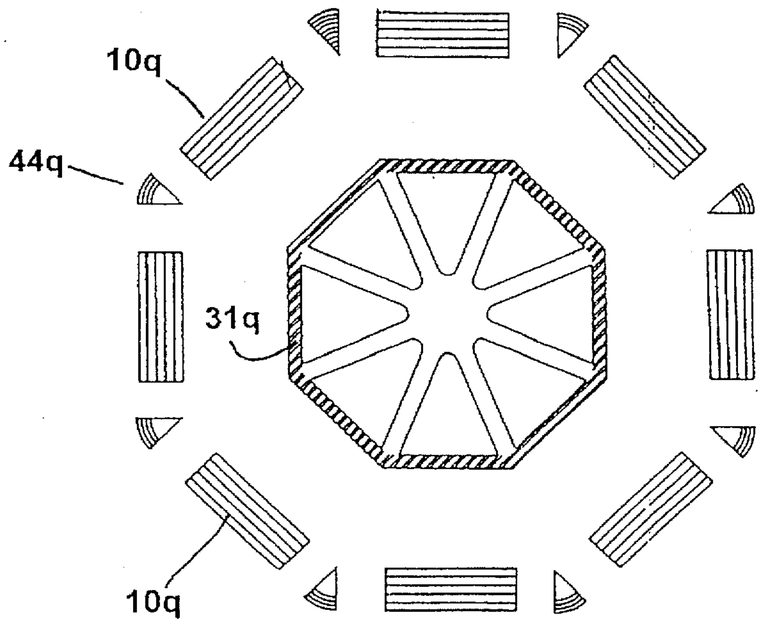
FIG. 28 is a schematic end elevational view of the apparatus in FIGS. 26 and 27 and separated honeycomb blocks.

Referring now to FIGS. 17 and 18, this illustrates apparatus and a method for in-line, two-sided windup formation of honeycomb blocks. (In FIGS. 26–28 is depicted a multiple sided forming apparatus to be described hereinafter.) Specifically as to FIGS. 17 and 18, web substrate material 14L is paid out from alternating coils 26L (first and second substrate feeding means), here shown to be two in number, with a pair of node spools 29L (first and second node strip feeding means) of thermoplastic strips 21L or filaments being simultaneously unwound to pay out strips of thermoplastic node material, one set of strips between two layers of substrate and the other beneath the lower substrate. These two layers of substrate and two series of node strips then pass between a pair of press rolls 24L and 28L, the upper one 24L being heated, so that the node material is softened to bond to the substrate layers. The bonded layers and strips are then advanced to a windup form shown in the form of a plate 31L which rotates about a transverse axis 33L intermediate its ends, causing the layers of substrate and node strips to be wound upon each other to a desired thickness and number of layers. This creates two unexpanded blocks of honeycomb, one on each face of the plate. The individual blocks can then be severed from each other and from the plate, removed, and placed individually in a press in which they are heated above the nodal material softening temperature and pressed, to fuse the material together only along the node sites. Alternatively, the layers can all be pressed and heated while still on the windup plate, then severed and removed as blocks. The blocks are ultimately expanded into honeycomb structures.

In FIGS. 26–28 is disclosed an alternative apparatus 10Q and method to those just described relative to FIGS. 17 and 18. In this apparatus the node strips are bonded to substrate layers and two substrate layers are bonded together as well as to the node strips, as the layers and node strips are wound onto the rotating, multiple faced windup form or mandrel 31Q. Hence, no further or subsequent press and bonding steps or cycles are necessary. Rather, the individual, bonded, unexpanded honeycomb blocks are severed from the mandrel and subsequently expanded and/or cut as desired.

Referring more specifically to FIGS. 26–28, the apparatus comprises a multiple faced form or mandrel 31Q which is shown to have eight faces around its periphery, but can have as few as two faces or as many faces as desired, conceivably up to an infinite number, i.e., cylindrical surface. The mandrel is mounted to rotate about its central, transverse axis. Powered rotation of this mandrel causes a pair of webs 14Q of substrate from coils 26Q to be wound thereon, as well as a pair of a series of laterally spaced, endless, intermediate node strips 21Q from spools 29Q between the substrate layers. Although two substrate layers and two sets of node strips are shown here to be wound simultaneously onto the mandrel, only one or several such layers and sets could be employed. Adjacent the periphery of mandrel 31Q is an elongated, rotational, heated press roll 40Q which presses the two layers of newly wound substrate and the intermediate node strips onto the underlying layers on the mandrel, to bond the node strips and substrate layers together as they are wound onto the mandrel. One set of the node strips is laterally offset relative to the other set an amount equal to one-half the spacing between those in the other set, as in the other embodiments disclosed. Hot air jet manifolds 42Q with nozzles assist in elevating the node strip temperature to a point above the softening temperature and the melting temperature thereof. Roll 40Q is mounted on spring biased flex supports (not shown) to allow it to follow the mandrel periphery while being biased toward the mandrel. After the desired number of substrate layers and node strips are wound onto the mandrel and bonded together, rotation of the mandrel is stopped and individual honeycomb blocks 10Q are severed from each other (FIG. 28). This can result in a small amount of scrap, shown in the form of pie-shaped pieces 44Q, at the corner junctions of the mandrel faces. The honeycomb blocks are later expanded as desired.

Figure 19:
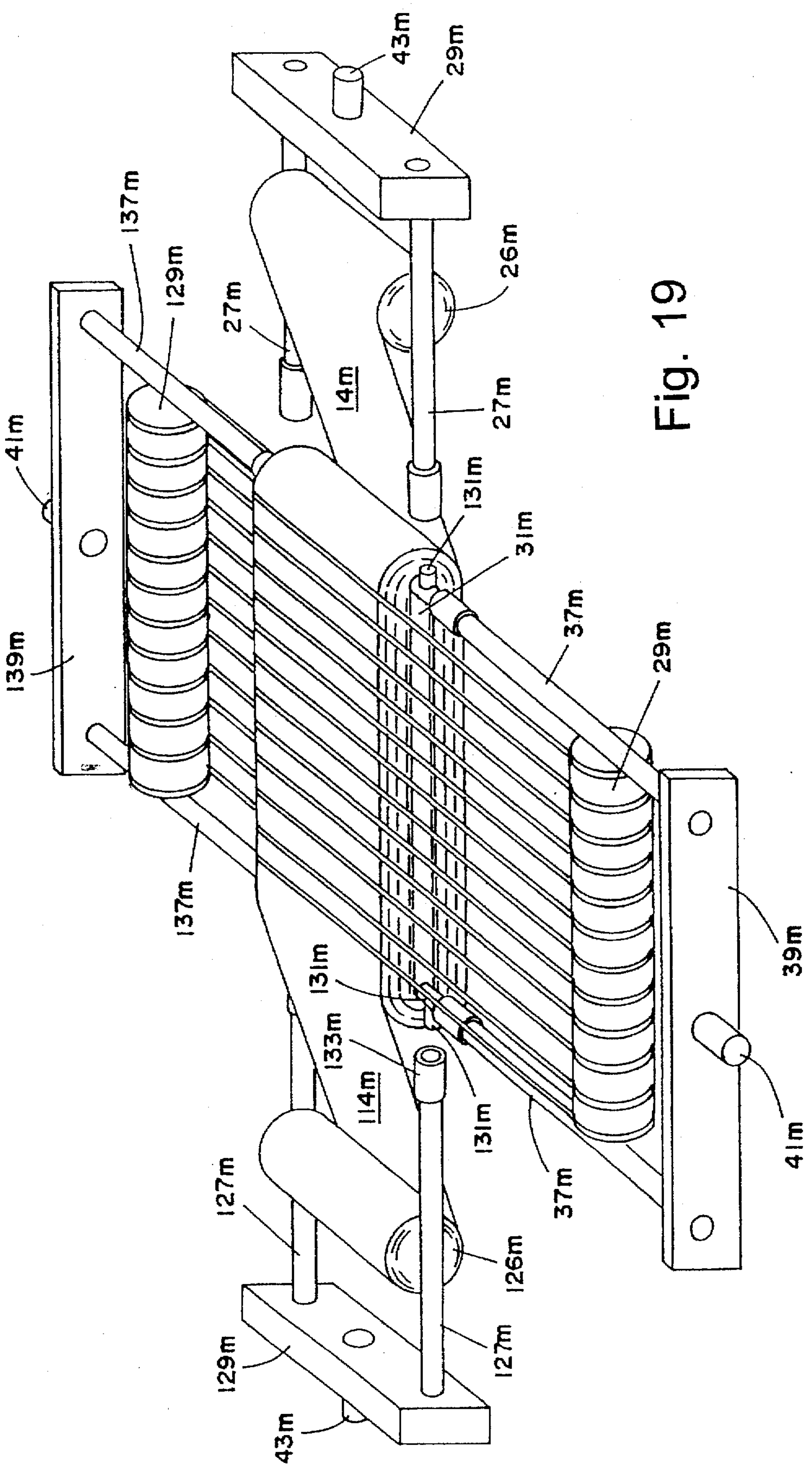
FIG. 19 is an isometric view of a cross wind web and transverse strip laminator for forming two honeycomb blocks.
Figure 20:
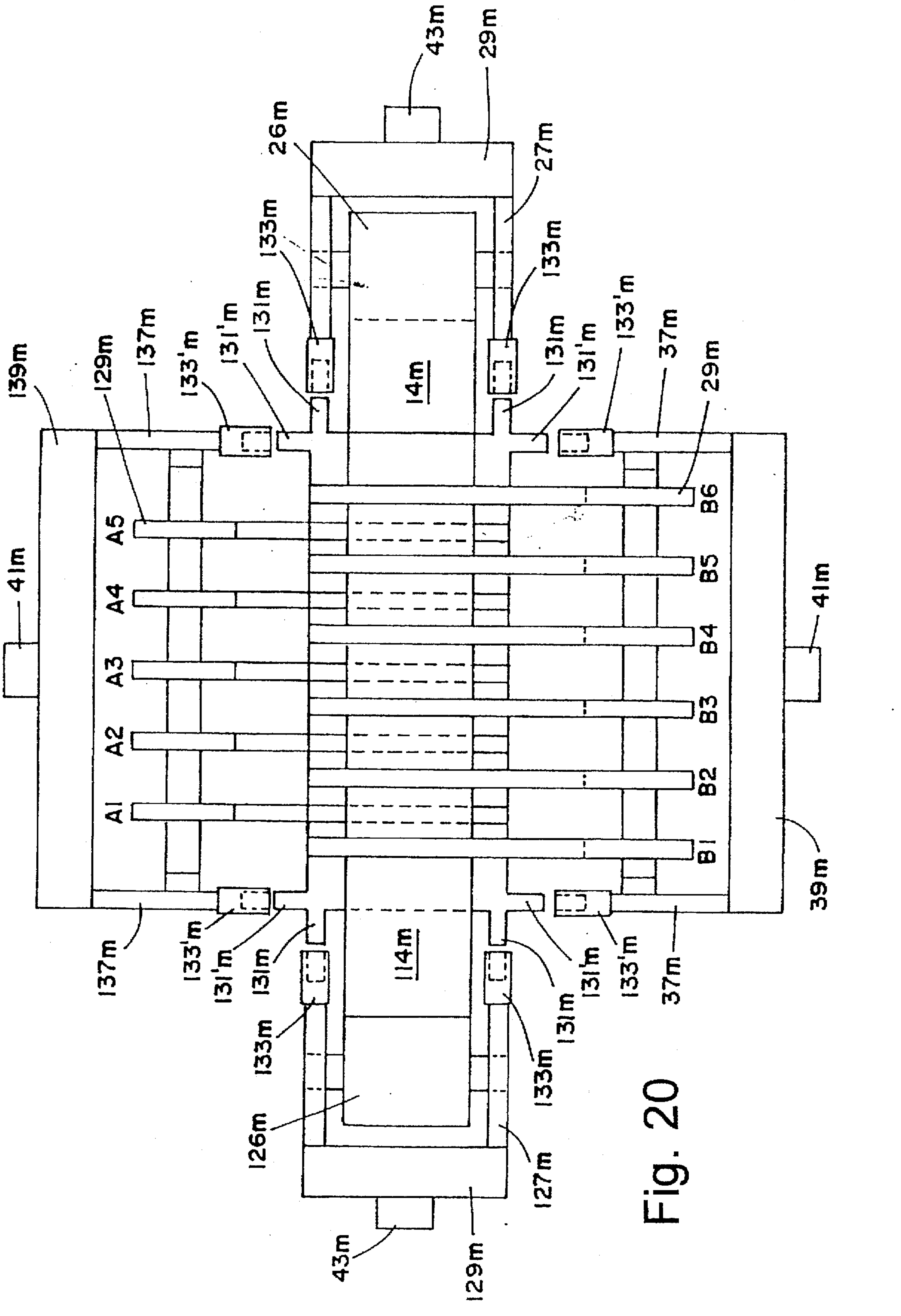
FIG. 20 is a top plan view of the apparatus in FIG. 19.
Figure 21:
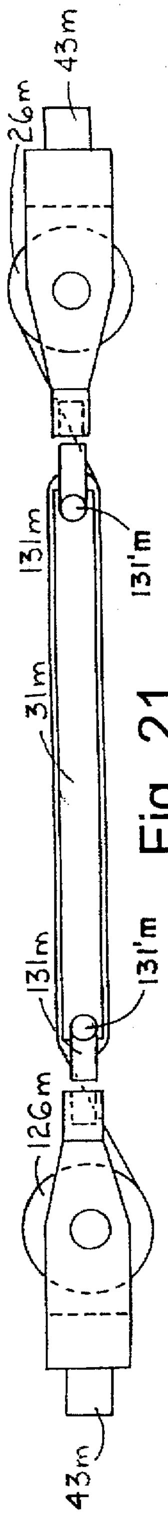
FIG. 21 is a sectional elevational view of the apparatus in FIGS. 19 and 20.
Figure 23:
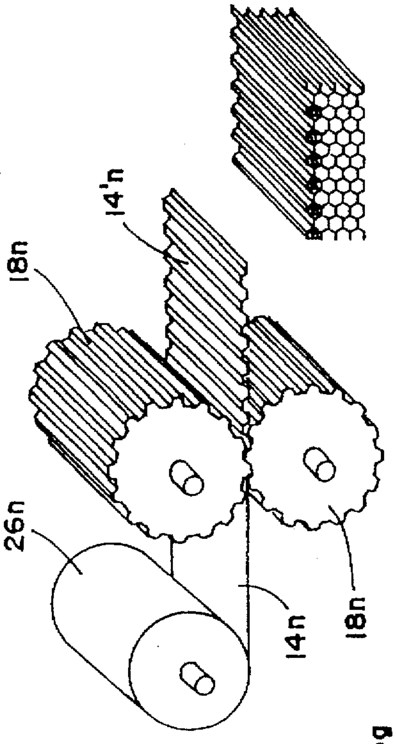
FIG. 23 is an isometric view of the corrugator in FIG. 22, with the web cut into sheets and solid node strips applied for forming a honeycomb.
Figure 22:
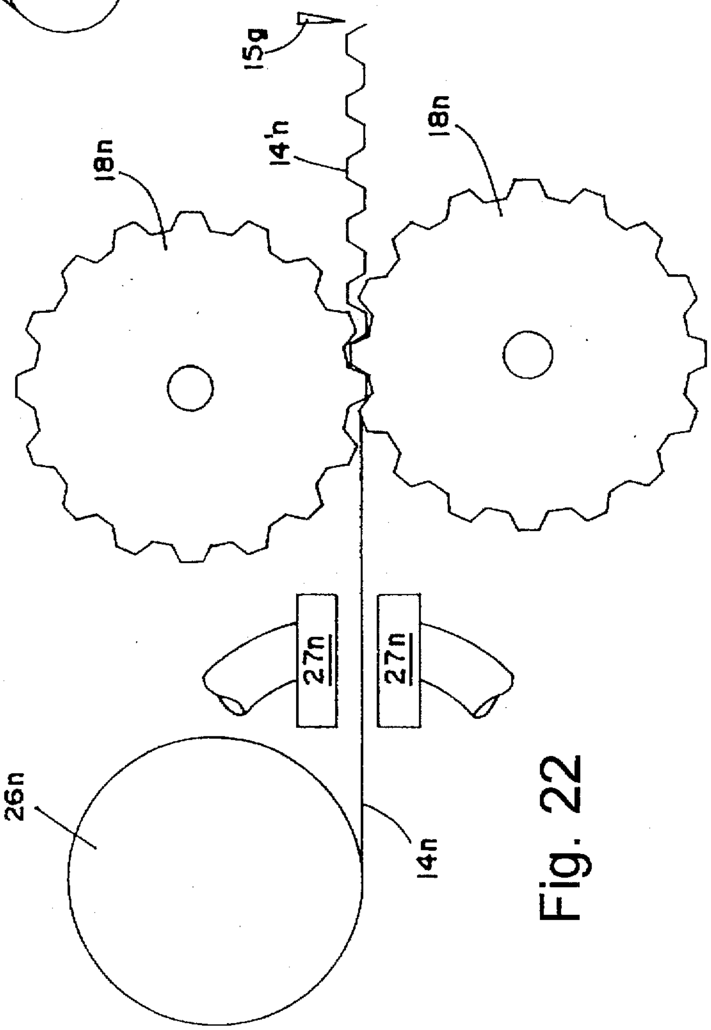
FIG. 22 is an end elevational view of a web corrugator.
Figure 24D:
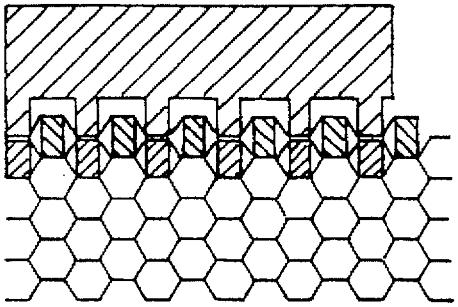
FIGS. 24A–D are end views of the sequential honeycomb forming steps using the apparatus in FIGS. 22 and 23.
Figure 24C:
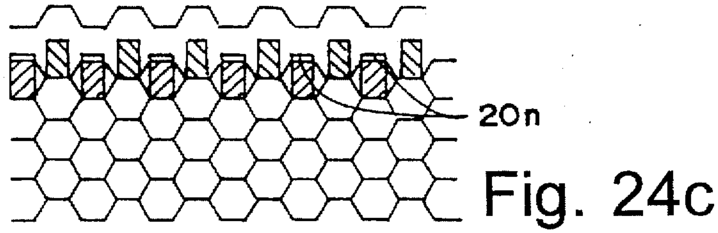
Figure 24B:
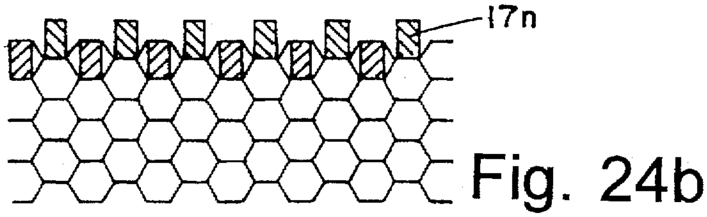
Figure 24A:
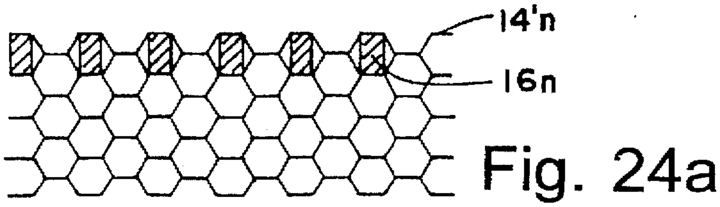

FIGS. 19, 20 and 21 illustrate a more complex cross wind arrangement employing a double action winder on axes which are normal to each other, such that winding in one dimension winds a pair of webs on the plate-type, windup form, and winding in the transverse dimension winds a pair of sets of strips on the form. The pair of webs 14M and 114M of substrate material are applied from opposite ends of the winder to the windup plate 31M from a pair of web coils 26M and 126M. Web coils 26M and 126M are suspended from respective pairs of laterally spaced, elongated supports 27M and 127M secured to respective cross beams 29M and 129M. These supports and cross beams are movable toward and away from winder plate 31M so as to respectively engage or disengage their end sockets 133M to or from a first set of four extending connector pins 131M. Two laterally spaced pins extend from each end of plate 31M in the opposite direction to the two spaced pins on the opposite end of plate 31M. When these pins and sockets are disengaged, the winder plate is free to rotate 180° in the dimension of webs 14M and 114M to apply a layer of web on each of the opposite faces of plate 31M. This action is caused by rotation of plate 31M about a central transverse axis on pins 41M. This rotary motion is intermittent with rotation of plate 31M in the transverse dimension to apply two series of nodal strips across the layers of web on the opposite faces of plate 31M, as set forth below.

Two sets of nodal strips extend from spools 29M and 129M mounted on opposite sides of plate 31M, each on a pair of elongated, spaced supports 37M and 137M secured to respective cross beams 39M and 139M, respectively. Supports 37M and 137M each have end sockets 133'M that engage to or disengage from four pins 131'M. These latter pins 131'M are normal to pins 131M. Two of these latter pins 131'M extend from one side of plate 31M and two extend in the opposite direction from the opposite side of plate 31M. The supports 37 and 137 are movable toward and away from each other to engage or disengage the pins 131'M and sockets 133'M. When these are disengaged, and the pins 131M are engaged with their sockets 133M, plate 31M can be rotated 180° to wrap one set of nodal strips across one web face, e.g., on the top of plate 31M, and wrap the second set of nodal strips across the second web face, e.g., on the bottom of plate 31M. These two opposite sets of strips are laterally offset relative to each other midway of the node strip spacings. Hence, when spools 29M apply one set of node strips on one face of plate 31M, the next set of node strips will be applied on this one face by spools 129M laterally offset from the first set. These node strips are applied when plate 31M is pivoted around the longitudinal axis of a pair of opposite coaxial pivot pins 43M mounted on cross beams 29M and 129M. By having the node strips which are wound upon the plate and upon the web substrate from one direction, offset relative to the node strips wound from the opposite direction, by an amount which is one-half the spacing between the node strips, the alternate node strips between successive layers of substrate are laterally offset to allow the honeycomb to be formed later. As noted, these alternating winding mechanisms rotate 180° and then stop, the drive mechanism for that mechanism then disengaging while the alternate drive mechanism for the transverse winder engages, and that winder then rotates 180°. The winding action automatically forms two honeycomb blocks, one on top and one beneath the windup plate. When the layers are the required thickness, the winding is stopped, the two layer stacks are heated and pressed, and the two resulting blocks are severed and removed from the plate and each other for expansion into honeycomb.

In FIGS. 22, 23 and 24A–24D is shown apparatus for a corrugation method of forming honeycomb, utilizing solid node thermoplastic bonding strip material. More specifically, web stock 14N is uncoiled from the coil 26N and passed between a pair of heating elements 27N to soften the web, and then between a pair of cooperative interengaging corrugating rollers 18N. The resulting corrugated substrate 14'N resulting is cut to length by a suitable cutter 15G and placed on a plurality of parallel, elongated, transverse, metal formers or fingers 16N which have a height equal to the corrugation cell height. Thus, the metal formers are equal in height to the height of the honeycomb cell to be formed. After one corrugated sheet is placed on these metal formers, a second set of formers 17N is placed on top of this corrugated sheet so that the formers are at alternating elevations one-half cell height and width apart. A plurality of solid node strips of thermoplastic nodal material is then placed along the spaced, parallel, coplanar, elevated upper surfaces or crests of the corrugated sheet. Then another corrugated sheet is lowered onto the second set of formers so that its depressions engage these strips on the elevated crests of the layer therebelow. A heated platen 42N is then brought down into engagement with the uppermost corrugated sheet, pressing it and the next adjacent sheet down into engagement with the first set of formers 16N, thereby heating and softening the node strips of solid material 20N between the engaging overlapping corrugated sheets. This bonds the corrugated sheets together, after which the lower set of formers is then removed, another plurality of nodal strips placed on the alternate upper corrugated sheet, and a further corrugated sheet is placed on top of it, heated and pressed for repeat of the sequence until a honeycomb structure of the desired height is made.

Figure 25:
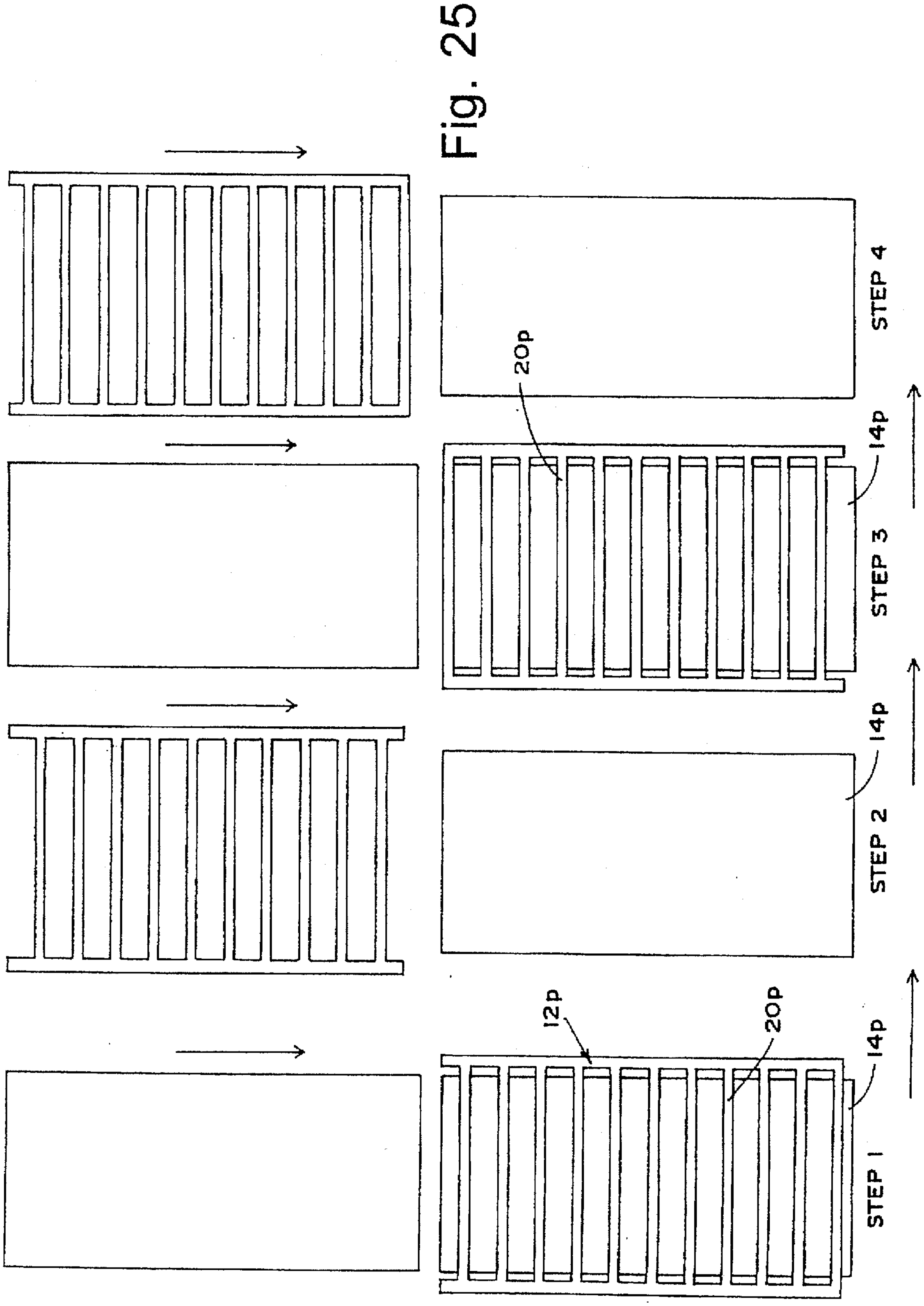
FIG. 25 is a plan view of steps of forming a honeycomb block using stencil node material.

If desired, nodal template units as illustrated at 12P in FIG. 25 may be utilized for the node strips, e.g., in the corrugation method. Alternatively, the template type arrangement shown in FIG. 25 can be employed with the expansion type system. This template type arrangement includes a plurality of parallel strips 20P of node material connected at their ends by transverse carrier strips which can later be removed if desired. The length of the node strips enables them to extend across the entire width of the sheet substrate stock 14P. The successive templates have offset nodal strips relative to each other. Thus, referring to FIG. 25, step 1, the first block forming sheet will have the first nodal template with its node strips applied thereto, a second sheet will then be advanced over the top of this template, a second template of nodal strips (step) 2) offset to be midway between the node strips previously applied to the sheet therebeneath, another sheet advanced (step 3), and another template of nodal material advanced (step 4), comparable to that in step 1, on top of the last sheet, and so forth. Ultimately the desired number of layers of substrate and nodal strips is obtained, and these are heated above the softening point and pressed to cause bonding of the thermoplastic nodal strips to the surface fibers of the substrate sheets. The block is cooled, and later expanded to form honeycomb.

There are several advantages to the novel process: 1) Limited, controlled flow of the softened node strip is controlled by the application of heat and pressure to the node strips and use of reinforcing material, making it possible to bond layers of the substrate without preimpregnating, since the node material does not bleed or penetrate through the porous materials; 2) No solvent need be used in this process. Such solvents not only cause bleeding of the material through each layer but also result in environmental problems during evaporation thereof; 3) The node material can be of a variety of forms; 4) High temperature thermoplastic materials can be used in applications where higher service temperatures are encountered; 5) Better sequence of manufacture. All dipping is performed after the block has been made. If desired, the block can be left as raw fabric core; 6) Easier expansion process. The block will expand much more easily due to absence of resin on the fabric to make it stiffer. The block will not tend to become a "brick" because of improper cure of resin. The product will not tend to fail due to material brittleness resulting from improper cure or quantity of resin; 7) Nodes can be reinforced as with glass, quartz, carbon fiber, or other engineering materials, including thermosetting and thermoplastic materials. Orientation of reinforcement fibers can be arranged so that core properties can be improved; 8) Holes can be eliminated. Porosity in the fabric can be eliminated by laminating with thermoplastic film; 9) Many combinations of materials can be used. The substrate may be reinforced with thermoset material, thermoplastic material, or a combination of both. Reinforcement of the nodes can be different from the reinforcement of the substrate in both material and orientation; 10) No precuring of adhesive prior to bonding is required; 11) The node material is dry as applied; 12) Where desired, node material can be precured prior to application.

Further, node strength can be optimized through resin flow which is controlled by 1) selection of node material with desired melt and softening temperatures, and b) change of melt and softening temperatures by use of selected reinforcing materials such as glass, carbon, etc. (e.g., addition of glass filaments raises such temperatures). Also, bonding pressure is applied more directly to the node area due to the thickness of node strips.

These and several other advantages, features and various modifications will be apparent to those in the art upon studying this disclosure. Hence, the invention is not intended to be limited to the preferred embodiments set forth herein as illustrative of the invention, but only by the scope of the appended claims and the reasonably equivalent structures and processes to those defined therein.

The embodiments of the invention in which an exclusive property or privilege is claimed are defined as follows:

1. An apparatus for forming a precursor block expandable into a honeycomb structure, comprising:

a substrate feeder for advancing substrate layers;

node strip feeding means for advancing successive sets of pluralities of polymeric node strips in parallel relationship, at equal spacings, onto said substrate layers, one set for each layer, and for advancing successive sets of spaced, parallel node strips laterally off-set half way relative to the strip spacing of the set therebelow;

said node strip feeding means comprises spools of solid, continuous thermoplastic node strips; and heating means for heating said node strips to a temperature above the softening point of said node strips as said node strips are advanced from said node strip feeding means and prior to said node strips being applied onto said substrate layers.

2. An apparatus for forming a precursor block expandable into a honeycomb structure, comprising:

a rotational form;

a first substrate feeder for advancing a first substrate layer onto said rotational form;

first node strip feeding means for advancing a first set of at least three solid polymeric node strips in parallel relationship, at equal spacings, onto said first substrate layer as said first substrate layer is fed onto said rotational form;

a second substrate feeder for advancing a second substrate layer onto said first set of node strips as said node strips are advanced onto said first substrate layer;

second node strip feeding means for advancing a second set of at least three spaced, parallel solid polymeric node strips onto said second substrate layer, said second node strip feeding means advances said second set of node strips laterally offset halfway relative to the spacing of said first set of node strips;

said node strip feeding means comprises spools of solid, continuous thermoplastic node strips; and heating means for heating said first and second sets of node strips to a temperature that is above the softening point of said node strips but below the melting point of said node strips as said node strips are advanced form said first and second node strip feeding means and prior to said node strips being applied onto said substrate layers such that first and second substrate layers are bonded together by said node strips to form a precursor block that is expandable into a honeycomb structure.

3. Apparatus for forming a precursor block expandable into a honeycomb structure, comprising:

a substrate feeder for advancing substrate layers;

node strip feeding means for advancing successive sets of pluralities of polymeric node strips in parallel relationship, at equal spacings, onto said substrate layers, one set for each layer, and advancing successive sets of spaced, parallel node strips laterally offset halfway relative to the strip spacing of the set therebelow;

said node strip feeding means comprises spools of solid, continuous thermoplastic node strips; and a heatable pressure applicator located for softening said node strips and pressing them into bonding relationship with said substrate layers to form a block, whereby expansion of the block will effect a honeycomb structure.

4. The apparatus in claim 3 wherein said node strip feeding means further comprises shiftable node strip grippers and cutters for gripping, cutting, and shifting said node strips over the substrate layer.

5. The apparatus in claim 3 wherein said heatable pressure applicator comprises cooperative rotational pressure rolls for squeezing and advancing the substrate layer and strips therebetween.

6. The apparatus in claim 3 wherein said heatable pressure applicator comprises press platens.

7. The apparatus in claim 3 wherein said substrate feeder comprises a web feeder, and wherein said apparatus includes a web cutter arranged to cut the web into a plurality of sheets.

8. The apparatus in claim 3 further including a rotational form around which substrate and strips are wound.

9. The apparatus in claim 8 wherein said rotational form has a multiple of faces, and including a heated pressure roll for bonding the node strips and substrate layers together.

10. The apparatus in claim 9 wherein said substrate feeder comprises means for simultaneously feeding at least two substrate layers, and said node strip feeding means comprises means for simultaneously feeding at least two sets of node strips between substrate layers.

11. The apparatus in claim 8 wherein said rotational form has opposite sides and is rotational about a first axis through said opposite sides, to wind substrate, and has opposite ends and is rotational about a second axis through said opposite ends and normal to said first axis, to wind node strips.

12. The apparatus in claim 11 wherein said node strip feeding means also comprises first and second pluralities of equally spaced node strip spools which feed node strips in directions normal to that direction which the substrate is fed by the substrate feeder, from said opposite sides of said rotational form, with said first plurality of node strip spools causing node strip feed laterally offset relative to node strip feed from said second plurality of node strip spools by an amount which is one-half of the equal spacing between node strip spools.

13. The apparatus in claim 12 wherein said substrate feeder comprises first and second substrate web supplies on said opposite ends of said forming member.

* * * * *

UNITED STATES PATENT AND TRADEMARK OFFICE

CERTIFICATE OF CORRECTION

PATENT NO.: 5,746,879
DATED : May 5, 1998
INVENTOR : Fritz Huebner et al.

It is certified that error appears in the above-identified patent and that said Letters Patent is hereby corrected as shown below:

Column 6, line 54;

"500-55° F." should be --500-550° F.--.

Column 7, line 44;

"controls" should be --continuous--.

Column 10, line 52;

"tipper" should be --upper--.

Column 11, line 23;

"front" should be --from--.

Column 14, line 34;

"(step) 2)" should be --(step 2)--.

Column 16, claim 2, line 4;

"form" should be --from--.

Signed and Sealed this

Twenty-ninth Day of December, 1998

Attest:

BRUCE LEHMAN

*Attesting Officer*

*Commissioner of Patents and Trademarks*